US011164173B2

(12) United States Patent
Tiwaree et al.

(10) Patent No.: US 11,164,173 B2
(45) Date of Patent: Nov. 2, 2021

(54) SYSTEMS AND METHODS FOR PERFORMING PAYMENT TRANSACTIONS USING MESSAGING SERVICE

(71) Applicant: MASTERCARD INTERNATIONAL INCORPORATED, Purchase, NY (US)

(72) Inventors: Prashanna S Tiwaree, New York, NY (US); Pablo Fourez, White Plains, NY (US); Gerardo Cardone, Staten Island, NY (US)

(73) Assignee: Mastercard International Incorporated, Purchase, NY (US)

(*) Notice: Subject to any disclaimer, the term of this patent is extended or adjusted under 35 U.S.C. 154(b) by 107 days.

(21) Appl. No.: 16/288,440

(22) Filed: Feb. 28, 2019

(65) Prior Publication Data

US 2019/0266589 A1 Aug. 29, 2019

Related U.S. Application Data

(60) Provisional application No. 62/636,548, filed on Feb. 28, 2018.

(51) Int. Cl.
*G06Q 20/32* (2012.01)
*G06Q 20/36* (2012.01)

(52) U.S. Cl.
CPC ....... *G06Q 20/322* (2013.01); *G06Q 20/3255* (2013.01); *G06Q 20/363* (2013.01)

(58) Field of Classification Search
None
See application file for complete search history.

(56) References Cited

U.S. PATENT DOCUMENTS

| | | | |
|---|---|---|---|
| 9,886,689 B1* | 2/2018 | Paulin | G06Q 20/223 |
| 2014/0279466 A1 | 9/2014 | Capps | |
| 2016/0125371 A1* | 5/2016 | Grassadonia | G06Q 20/34 |
| | | | 705/44 |
| 2016/0321625 A1 | 11/2016 | Gilliam, III et al. | |
| 2016/0342962 A1* | 11/2016 | Brown | G06Q 20/10 |
| 2017/0249622 A1* | 8/2017 | Ortiz | G06Q 20/387 |
| 2019/0116140 A1* | 4/2019 | Bailly | H04L 51/38 |

OTHER PUBLICATIONS

Solano A, Dormido R, Duro N, González V. One-Time URL: A Proximity Security Mechanism between Internet of Things and Mobile Devices. Sensors (Basel). 2016;16(10):1694. Published Oct. 13, 2016. doi: 10.3390/s16101694 (Year: 2016).*
"PCT Notification of Transmittal of the International Search Report and the Written Opinion", International Searching Authority, dated May 28, 2019 (May 28, 2019), International Application No. PCT/US2019/020008, 8 pp.

* cited by examiner

*Primary Examiner* — Gregory S Cunningham, II
(74) *Attorney, Agent, or Firm* — Buckley, Maschoff & Talwalkar LLC

(57) ABSTRACT

A message is generated, with the message including a URL (uniform resource locator). The URL points to a web location. The web location is for facilitating a payment to a payment recipient. The message is transmitted to a mobile device owned by the payment recipient.

12 Claims, 17 Drawing Sheets

SYSTEMS AND METHODS FOR PERFORMING PAYMENT TRANSACTIONS USING MESSAGING SERVICE

CROSS REFERENCE TO RELATED APPLICATION

This application claims the benefit of U.S. Provisional Patent Application No. 62/636,548 (filed on Feb. 28, 2018); the contents of which provisional application are hereby incorporated by reference for all purposes.

BACKGROUND

Applications such as Facebook Messenger, iMessage and WeChat are in widespread use. One feature of these applications is that payments can be made from one user of an application to another user of the application.

One limitation of the payment features of these applications is that the system is "closed loop". That is, payments can be sent using these applications only if both parties for the payment transaction are registered users of the application in question.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings, which illustrate preferred and example embodiments and which are not necessarily drawn to scale, wherein.

DESCRIPTION

In general, and for the purpose of introducing concepts of embodiments of the present disclosure, an "open loop" payment system is provided utilizing a mobile-to-mobile messaging service such as RCS (Rich Communication Services). The payment system is open-loop in the sense that the two parties may use different wallet or payment applications and/or may be served by different financial institutions. The payment transactions may be executed using the facilities of an existing payment card account network such as that operated by Mastercard International Incorporated, which is the assignee hereof.

Figure 1:
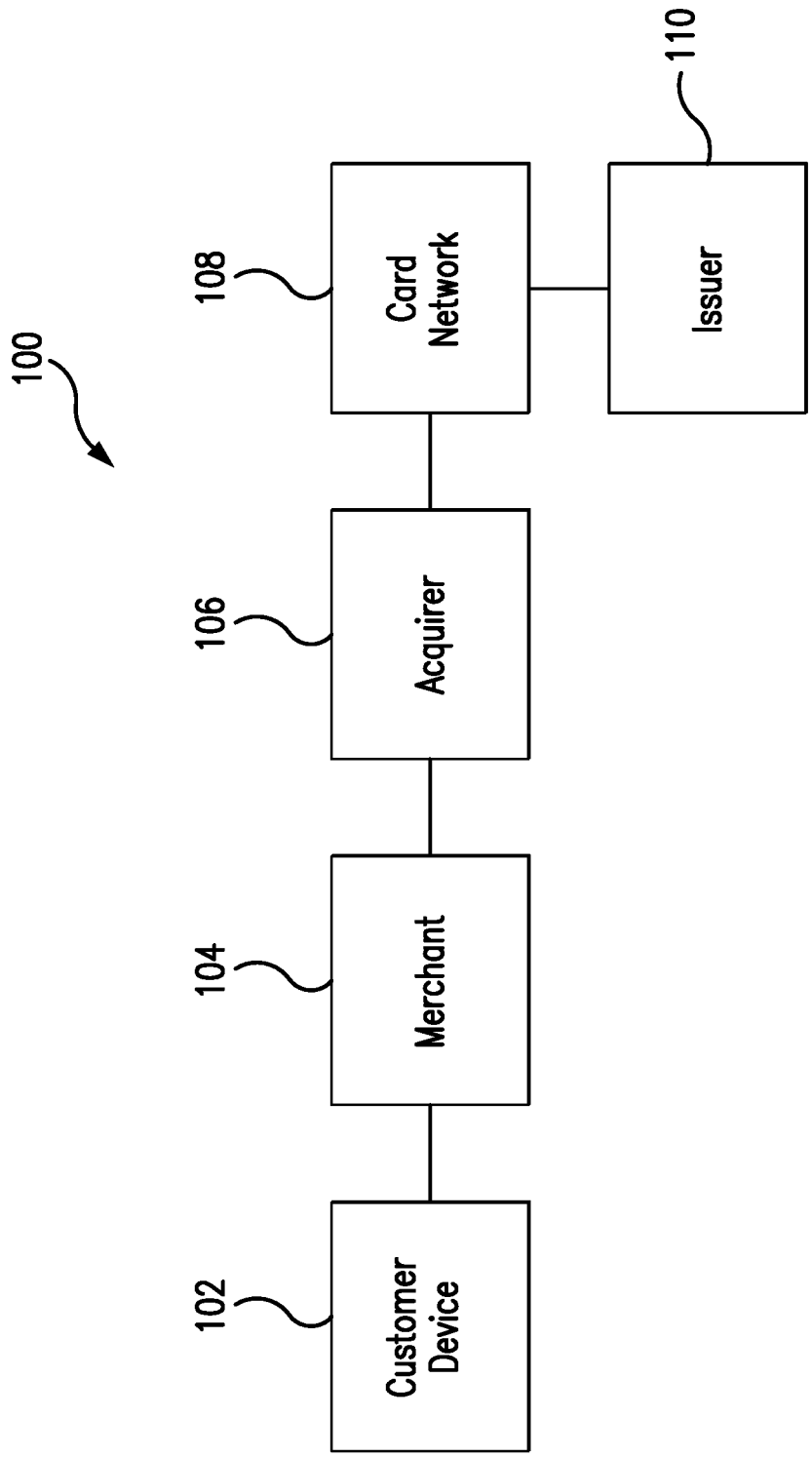
FIG. 1 is a block diagram of a payment card account system.

FIG. 1 is a block diagram that illustrates a payment card account system 100.

The system 100 includes a customer device 102 such as a magnetic stripe card, a payment IC (integrated circuit) card (contactless and/or contact), or a payment-enabled mobile device. Block 104 in FIG. 1 represents a merchant device such as a POS (point of sale) terminal/card reader. The merchant device 104 may also be considered part of the payment card account system 100. The customer device 102 may be presented to the merchant device 104, to consummate a purchase transaction and to permit the merchant device 104 to read payment card account data (including, e.g., a payment account number) from the customer device 102. In other situations, the merchant device 104 may be an e-commerce server computer, and the customer device 102 may be a personal computer, a mobile device running a mobile browser, etc.; in such situations, the customer device 102 may engage in an online shopping session with an e-commerce website hosted by the merchant device 104.

A computer 106 operated by an acquirer (acquiring financial institution) is also shown as part of the system 100 in FIG. 1. The acquirer computer 106 may receive a payment account system authorization request message for the transaction from the merchant device 104. The acquirer computer 106 may route the authorization request message via a card network 108 to a server computer 110 operated by the issuer of a payment account that is associated with the account number obtained by the merchant device 104 (e.g., from the customer device 102) and included in the authorization request message. The authorization response message generated by the payment issuer server computer 110 may be routed back to the merchant device 104 via the card network 108 and the acquirer computer 106.

One well known example of a card network is referred to as the "Banknet" system, and is operated by Mastercard International Incorporated, which is the assignee hereof.

The payment account issuer server computer 110 may be operated by or on behalf of a financial institution ("FI") that issues payment accounts to individual users such as the customer who presented or operated the customer device 102 referred to above. For example, the payment card issuer server computer 110 may perform such functions as (a) receiving and responding to requests for authorization of payment account transactions to be charged to payment accounts issued by the FI; and (b) tracking and storing transactions and maintaining account records.

The components of the system 100 as depicted in FIG. 1 are only those that are needed for processing a single transaction. A typical payment system may process many purchase transactions (including simultaneous transactions) and may include a considerable number of payment account issuers and their computers, a considerable number of acquirers and their computers, and numerous merchants and their devices, as well as a very large number of customer devices.

Figure 2:
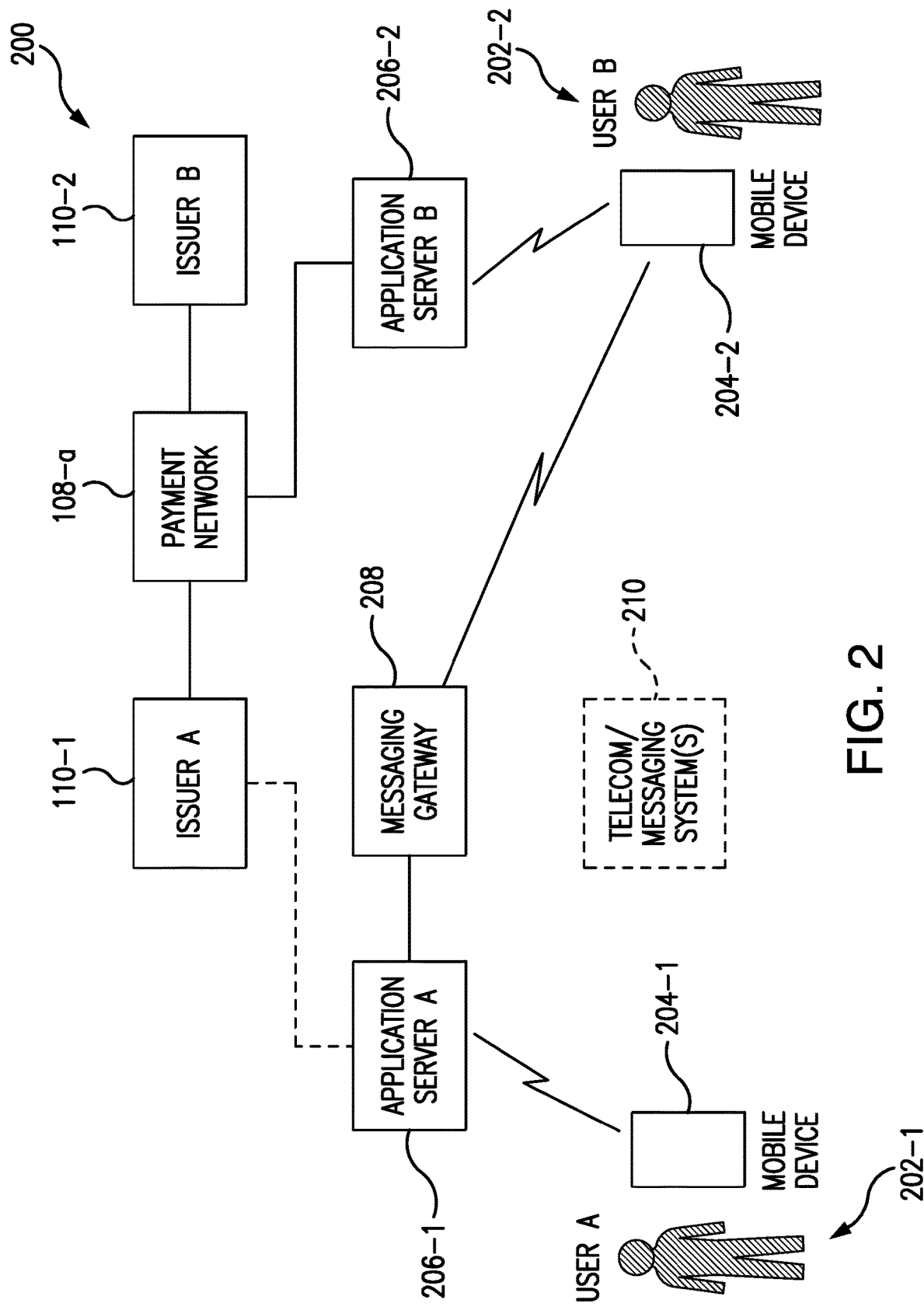
FIG. 2 is a block diagram of a payment transaction system provided in accordance with aspects of the present disclosure.

FIG. 2 is a block diagram of a payment transaction system 200 provided in accordance with aspects of the present disclosure.

In FIG. 2, two typical users 202-1 and 202-2 are schematically shown. User 202-1 may be the payer or payee of a payment transaction between the two users, while user 202-2 may be the payee or payer of the payment transaction.

The users 202-1 and 202-2 are respectively shown operating mobile devices 204-1 and 204-2. The mobile devices 204-1 and 204-2 may be deemed components of the payment transaction system 200. The mobile devices 204-1 and 204-2 may both be smartphones, for example. The functions performed by the mobile devices 204-1 and 204-2 in a typical payment transaction will be described below. Also details of a typical one of the mobile devices will be described below.

FIG. 2 schematically illustrates a typical payment transaction. In connection with the transaction, the mobile device 204-1 of the user 202-1 may be in communication with an application server 206-1. It is assumed that the application server 206-1 provides services in support of an application in which the user 202-1 is enrolled. The application in question may be a wallet application (e.g., provided by a wallet services provider (WSP)—not shown apart from the application server 206-1—or by a bank or other FI) or a payment application provided by a bank or other FI.

In connection with the transaction illustrated in FIG. 2, the mobile device 204-2 of the user 202-2 may be in communication with an application server 206-2. It is assumed that the application server 206-2 provides services in support of an application in which the user 202-2 is enrolled. Again, the latter application may be a wallet application or a payment application. It is assumed for present purposes (though it need not necessarily be the case) that the application in which the user 202-2 is enrolled is different from the application in which the user 202-1 is enrolled; correspondingly, it is assumed that the application server 206-2 is different from the application server 206-1 and that the two application servers are operated by different entities.

As will be seen, for some transactions, the application server 206-1 is in communication with a messaging gateway 208. The messaging gateway 208 may be, for example, an RCS gateway and may provide functionality to support messaging that allows the payment transaction to be performed.

The application server 206-2 may be in communication with a payment network 108-*a*. The payment network may encompass all of the functionality of the payment network 108 mentioned above in connection with FIG. 1, and may encompass additional functionality in accordance with aspects of the present disclosure as described herein.

The payment network 108-*a* interconnects payment account issuers 110-1 and 110-2. The issuers 110-1 and 110-2 may be of the type of entity referred to in connection with block 110 in FIG. 1. For present purposes, it is assumed that the issuer 110-1 issued a payment card account owned by the user 202-1 and selected for use in the transaction illustrated in FIG. 2; and it is also assumed that the issuer 110-2 issued a payment card account owned by the user 202-2 and selected for use in the transaction illustrated in FIG. 2.

Block 210, shown in phantom, represents one or more interconnected mobile telecommunications and/or messaging systems. The telecom/messaging infrastructure 210 enables RCS and/or other types of mobile telecommunications that take place between the mobile device 204-1 and the application server 206-1; between the messaging gateway 208 and the mobile device 204-2; and between mobile device 204-2 and the application server 206-2.

FIG. 2 is indicative of a payment transaction according to some scenarios. In other scenarios, as will be seen, the messaging gateway 208 may play no part, and there may be RCS messaging from the mobile device 204-1 directly addressed to the mobile device 204-2.

FIG. 2 only shows system components used in one transaction. In a practical embodiment of the payment system 200, there may be a very large number of users, and a correspondingly large number of mobile devices. There also may be considerable numbers of application servers and payment account issuers. Application servers may, in some instances, be operated by and/or integrated with, operations of payment card account issuers. There also may be a number of different messaging gateways provided as part of the system 200.

Any one or more of the blocks shown in FIG. 2, in addition to representing the indicated entity, may also be considered to represent one or more computer systems operated by such entity.

Figure 3:
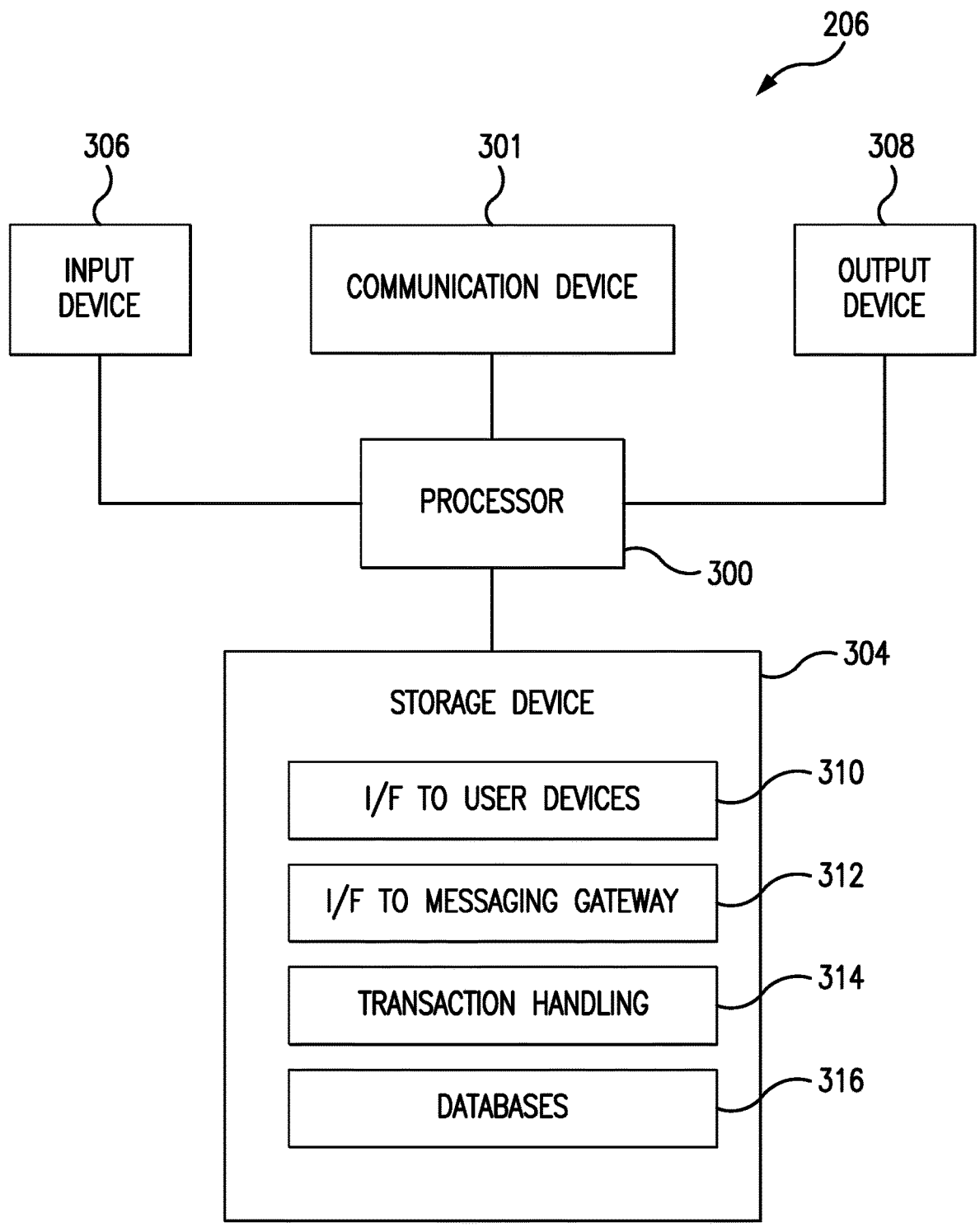
FIGS. 3 and 4 are block diagrams of example computer systems that may perform functions in the system of FIG. 2.

FIG. 3 is a block diagram of a typical example of an application server 206 that may perform functions in the system of FIG. 2. The application server 206 may, in its hardware aspects, resemble a typical server computer and/or mainframe computer, but may be controlled by software to cause it to function as described herein.

The application server 206 may include a computer processor 300 operatively coupled to a communication device 301, a storage device 304, an input device 306 and an output device 308. The communications device 301, the storage device 304, the input device 306 and the output device 308 may all be in communication with the processor 300.

The computer processor 300 may be constituted by one or more processors. Processor 300 operates to execute processor-executable steps, contained in program instructions described below, so as to control the application server 206 to provide desired functionality.

Communication device 301 may be used to facilitate communication with, for example, other devices (such as other components of the payment transaction system 200, as well as mobile devices operated by users of the system 200). Communication device 301 may comprise numerous communication ports (not separately shown), to allow the application server 206 to communicate simultaneously with a number of other devices, including communications as required to simultaneously handle numerous interactions with other devices and/or numerous transactions.

Input device 306 may comprise one or more of any type of peripheral device typically used to input data into a computer. For example, the input device 306 may include a keyboard and a mouse. Output device 308 may comprise, for example, a display and/or a printer.

Storage device 304 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 304 stores one or more programs for controlling processor 300. The programs comprise program instructions (which may be referred to as computer readable program code means) that contain processor-executable process steps of the application server 206, executed by the processor 300 to cause the application server 206 to function as described herein.

The programs may include one or more conventional operating systems (not shown) that control the processor 300 so as to manage and coordinate activities and sharing of resources in the application server 206, and to serve as a host for application programs (described below) that run on the application server 206.

The storage device 304 may also store a software interface 310 that facilitates communication between the application server 206 and mobile devices operated by users of the system 200. In addition, the storage device 304 may store a software interface 312 that facilitates communication between the application server 206 and the messaging gateway 210.

The programs stored in the storage device 304 may further include, for example, a transaction handling application program 314. The transaction handling application program 314 may operate to handle transactions in a manner or manners to be described below.

The storage device 304 may also store, and the application server 206 may also execute, other programs, which are not shown. For example, such programs may include communications software and a reporting application. The latter program may respond to requests from system administrators for reports on the activities performed by the application server 206. The other programs may also include, e.g., device drivers, database management software, etc.

The storage device 304 may also store one or more databases 316 needed for operation of the application server 206.

Figure 4:
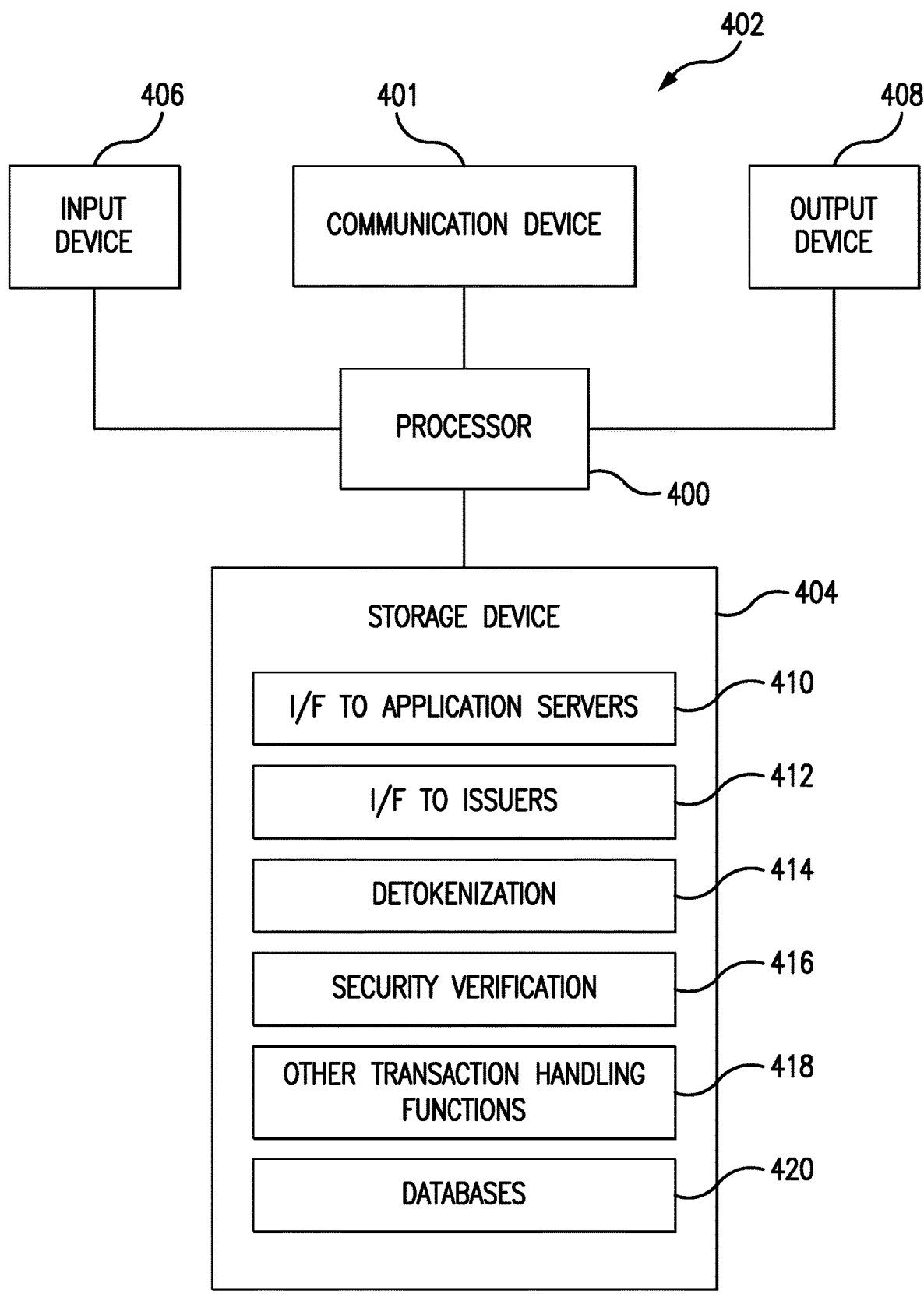

FIG. 4 is a block diagram that illustrates an example of a computer system 402 that may be operated by the payment network 108-*a* in accordance with aspects of the present disclosure. The computer system 402 will accordingly be referred to as a "payment network computer system". The payment network computer system 402 may have the same type of hardware architecture and the same types of hardware components as were described above in connection with FIG. 3. Accordingly, the payment network computer system 402 may include a processor 400 in communication with a communication device 401, a storage device 404, an input device 406 and an output device 408.

Storage device 404 stores one or more programs for controlling processor 400. The programs comprise program instructions (which may be referred to as computer readable program code means) that contain processor-executable process steps of the payment network computer system 402, executed by the processor 400 to cause the payment network computer system 402 to function as described herein.

The programs may include one or more conventional operating systems (not shown) that control the processor 400 so as to manage and coordinate activities and sharing of resources in the payment network computer system 402, and to serve as a host for application programs (described below) that run on the payment network computer system 402.

The storage device 404 may also store a software interface 410 that facilitates communication between the payment network computer system 402 and application servers 206 that are components of the system 200. In addition, the storage device 404 may store a software interface 412 that facilitates communication between the payment network computer system 402 and the payment account issuers 110.

The programs stored in the storage device 404 may further include, for example, a detokenization application program 414. The detokenization application program 414 may control the processor 400 such that the payment network computer system 402 performs (or obtains) translation of payment tokens into primary account numbers (PANs) that represent payment accounts used for transactions performed in the payment transaction system 200.

Still further, the storage device 404 may store a security verification application program 416. The security verification application program 416 may control the processor 400 such that the payment network computer system 402 is enabled to perform verification functions related to cryptograms and/or transaction contexts submitted in connection with transactions as described herein.

Moreover, the storage device may store one or more additional transaction handling application programs 418. The application programs 418 may perform other transaction handling functions of the payment network computer system 402, including functionality as ascribed to the payment network 108 in connection with FIG. 1.

Although the software features 414, 416 and 418 are indicated separately in the representation of FIG. 4, in practice at least some of these software features may be at least partially integrated with each other in a single application program or a cooperative group of application programs.

The storage device 404 may also store, and the payment network computer system 402 may also execute, other programs, which are not shown. For example, such programs may include communications software and a reporting application. The latter program may respond to requests from system administrators for reports on the activities performed by the payment network computer system 402. The other programs may also include, e.g., device drivers, database management software, etc.

The storage device 404 may also store one or more databases 420 needed for operation of the payment network computer system 402.

Other computerized components of the system 300 may be constituted by computer hardware having the same types of components and hardware architecture as described herein with reference to FIG. 3.

Figure 5:
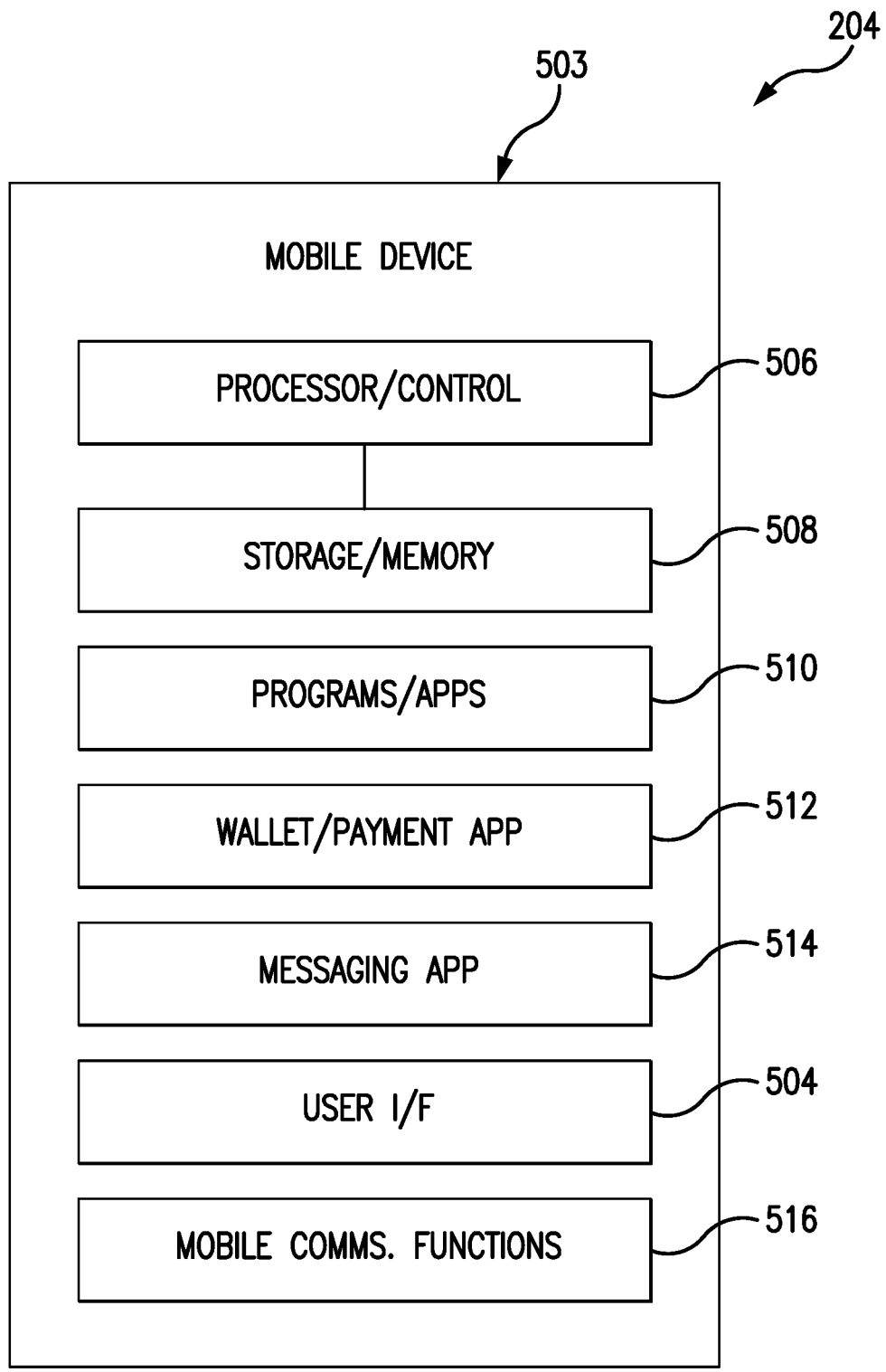
FIG. 5 is a simplified block diagram of an example of a typical mobile device that may be employed by a user of the system of FIG. 2.

FIG. 5 is a simplified block diagram of an example of a typical mobile device 204 that may be employed by a user of the system of FIG. 2.

The mobile device 204 may include a housing 503. In many embodiments, the front of the housing 503 is predominantly constituted by a touchscreen (not separately shown), which is a key element of the user interface 504 of the mobile device 204.

The mobile device 204 further includes a mobile processor/control circuit 506, which is contained within the housing 503. Also included in the mobile device 204 is a storage/memory device or devices (reference numeral 508). The storage/memory devices 508 are in communication with the processor/control circuit 506 and may contain program instructions to control the processor/control circuit 506 to manage and perform various functions of the mobile device 204. As is well-known, a device such as mobile device 204 may function as what is in effect a pocket-sized personal computer (assuming for example that the mobile device is a smartphone), via programming with a number of application programs, or "apps", as well as a mobile operating system (OS). (In general, the apps are represented at block 510 in FIG. 5, and may, along with other programs, in practice be stored in block 508, to program the processor/control circuit 506.)

Because of their particular pertinence to the present disclosure, a wallet and/or payment app 512 and a messaging app 514 are represented in the drawing separately from block 510. In addition to functions described herein, the wallet/payment app 512 may provide suitable functionality for, as is customary, allowing the user of the mobile device 204 to engage in transactions at the point of sale in a retail store. The messaging app 514 may, for example, support RCS messaging. From discussion below it will be seen that, at least in some roles and/or scenarios, the wallet app 512 and the messaging app 514 may interact with each other in the course of the user's participation in a payment transaction.

As is typical for mobile devices, the mobile device 204 may include mobile communications functions as represented by block 516. The mobile communications functions may include voice and data communications via a mobile communication network with which the mobile device 204 is registered.

From the foregoing discussion, it will be appreciated that the blocks depicted in FIG. 5 as components of the mobile device 204 may in effect overlap with each other, and/or there may be functional connections among the blocks which are not explicitly shown in the drawing. It may also be assumed that, like a typical smartphone, the mobile device 204 may include a rechargeable battery (not shown) that is contained within the housing 503 and that provides electrical power to the active components of the mobile device 204.

It has been posited that the mobile device 204 may be embodied as a smartphone, but this assumption is not intended to be limiting, as mobile device 204 may alternatively, in at least some cases, be constituted by a tablet computer or by other types of mobile computing devices.

Figure 6A:
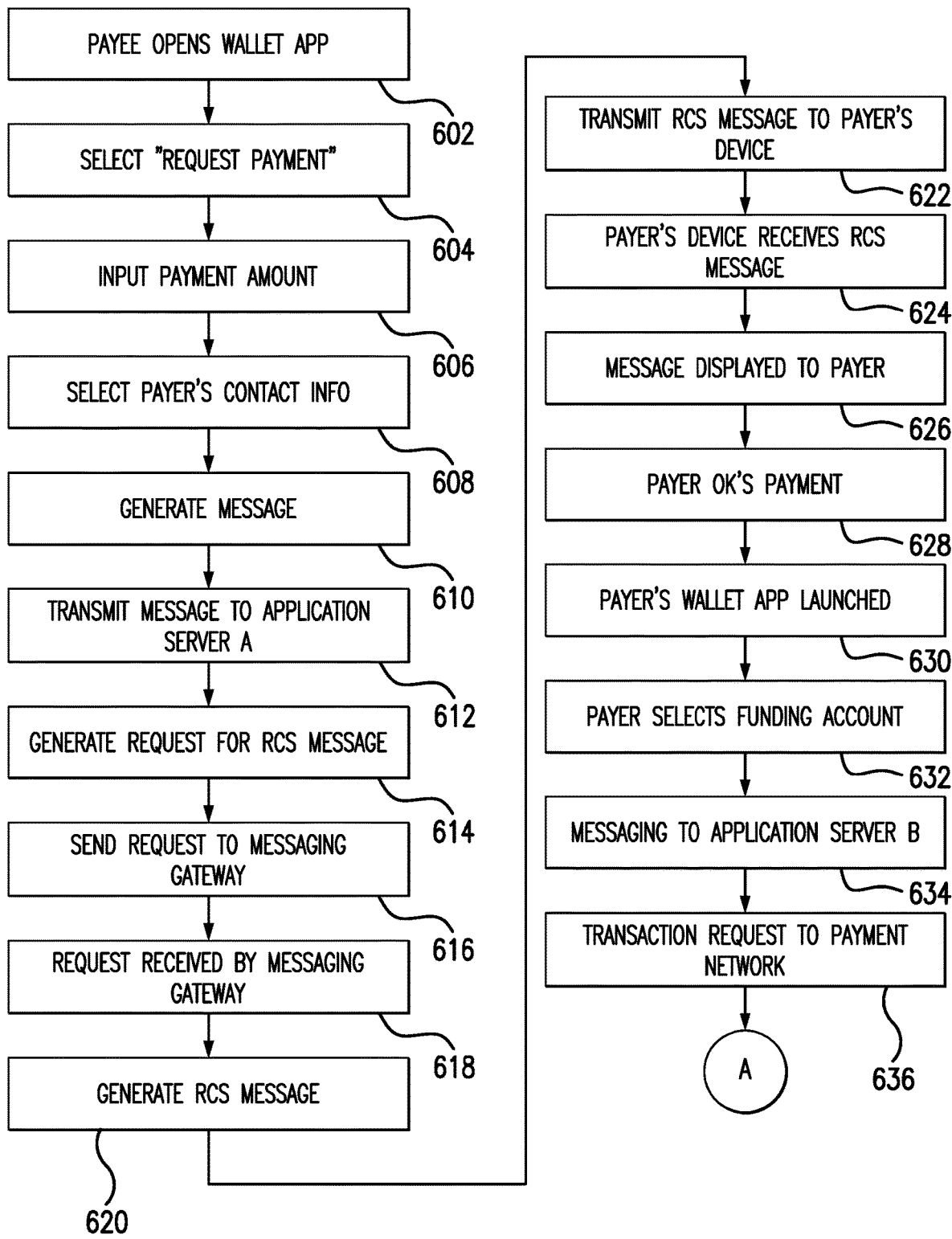
FIGS. 6A, 6B, 7, 8A, 8B and 9 are flow charts that illustrate processes that may be performed in the system of FIG. 2 in accordance with aspects of the present disclosure.
Figure 6B:
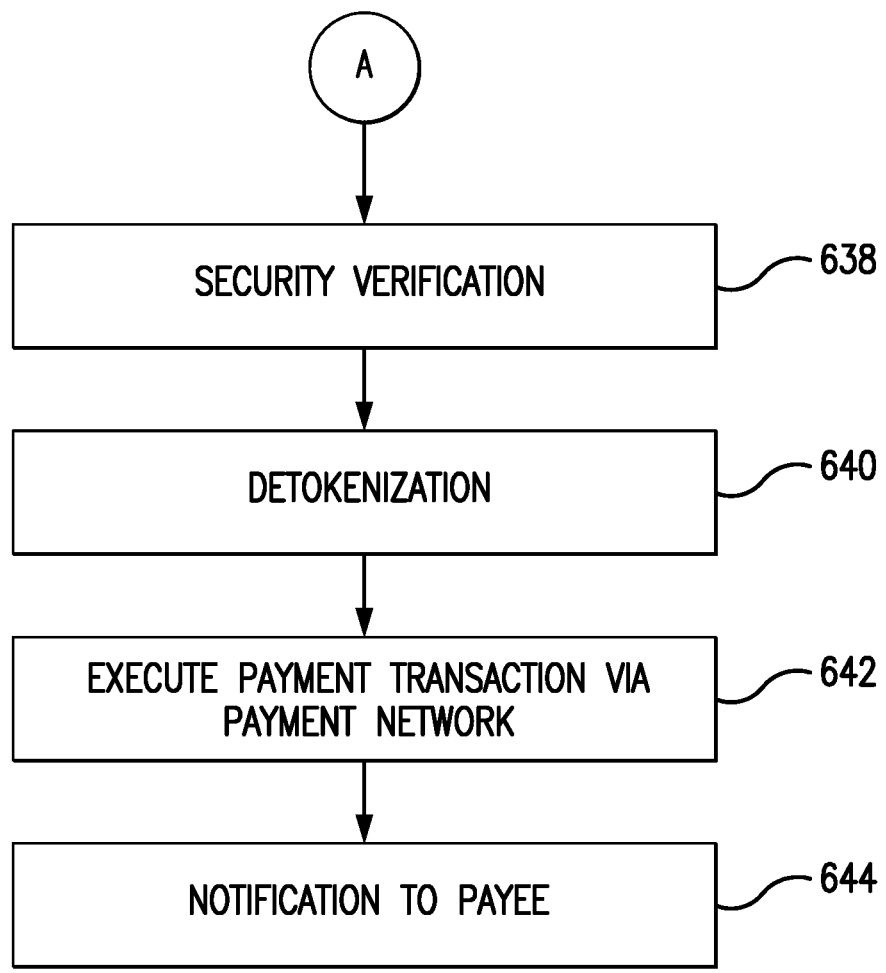

FIGS. 6A and 6B together form a flow chart that illustrates a process that may be performed in the system 200 of FIG. 2 in accordance with aspects of the present disclosure. In particular, the process of FIGS. 6A and 6B relates to a scenario in which the user 202-1 (also shown as "user A") is requesting a payment from the user 202-2 (also shown as "user B"). Also according to this scenario, the application server 206-1 and the messaging gateway 208 play roles in transmitting the proposal for the transaction to user 202-2. Because the user 202-1 is requesting payment in this scenario, he/she is indicated in the flow chart as the "payee", with user 202-2 indicated as the "payer" in the flow chart.

At 602 in FIG. 6A, the user 202-1 opens the wallet (or payment) app 512 on his/her mobile device 204-1. At 604, the user 202-1 selects a "request payment" option that is presented by the wallet/payment app 512 on the user interface 504 of the mobile device 204-1. At 606, the user 202-1 is prompted to, and does, enter the monetary amount of the payment that the user 202-1 wishes to receive.

At 608, the user 202-1 may select the proposed payer (assumed to be user 202-2) from a contacts list maintained in the wallet/payment app 512. In effect, this may result in the selection of the mobile telephone number assigned to the mobile device 204-2 operated by the user 202-2, with that mobile telephone number to be used as addressing information for subsequent messaging that is described below. (In an alternative scenario, and assuming the proposed payer is not on the wallet app contacts list, the user 202-1 may be allowed to enter the payer's mobile telephone number manually into the wallet app 512 for use in the transaction that is currently being requested.)

At 610, the wallet/payment app 512 generates a message to be sent to the application server 206-1. The message may contain data elements such as: a payment token that represents the payment card account in which the user 202-1 wishes to receive the requested payment; the amount of the requested payment; the mobile telephone number assigned to the mobile device 204-2 operated by the user 202-2; a transaction type (in this case, request-for-payment); and a cryptogram The cryptogram may be generated by the wallet/payment app 512 based on inputs that include the monetary amount of the requested transaction and the transaction type. In some alternative embodiments, the cryptogram may be generated by the application server 206-1. In some embodiments, the cryptogram may be generated so as to only be valid for a limited period of time, which may be of a very short duration such as 20 or 60 seconds. In some embodiments, the cryptogram may be generated in accordance with some or all of the principles applied in generating an application cryptogram in connection with an EMV point-of-sale transaction.

At 612, under the control of the wallet/payment app 512, the mobile device 204-1 sends to the application server 206-1 the message generated at 610. Block 612 may also be considered to represent the application server 206-1 receiving the message.

At 614, the application server 206-1 generates a request for an RCS message. The request may include all the data elements referred to above in connection with block 610. The request may also include the name of the user 202-1, which the application server may have looked up based on, e.g., the mobile phone number of the mobile device 204-1, other device identifying information associated with the mobile device 204-1, or the payment token. At 616, the application server 206-1 sends the request to the messaging gateway 208. At 618, the messaging gateway 208 receives the request sent at 616.

At 620, the messaging gateway 208 generates an RCS message (which may be thought of as a "rich" message) based on the request received at 618. The RCS message may be addressed to the mobile telephone number assigned to the mobile device 204-2 and may contain: branding (e.g., logo or the like) for the payment network that will be used for the transaction; the name of the user 202-1, the payment token representing the payment account of the user 202-1, the cryptogram, the transaction amount, and a message indicating that the user 202-1 is requesting a payment from the user 202-2.

At 622, the messaging gateway 208 may transmit to the mobile device 204-2 the RCS message generated at 620. At 624, the RCS message is received by the mobile device 204-2. At 626, the messaging app 514 of the mobile device 204-2 causes the RCS message to be displayed to the user 202-2 via the user interface 504 of the mobile device 204-2. Part of the displayed message may include an "Accept" button (virtual button on touchscreen). It is assumed that the user 202-2 actuates this button to accept the transaction (i.e., to make the requested payment to the user 202-1). This accepting of the transaction is indicated at block 628 in FIG. 6A, and causes the wallet/payment app 512 in the mobile device 204-2 to be launched, as indicated at block 630, so that the user 202-2 can select—from his/her digital wallet—the payment card account that the user 202-2 wishes to use to fund the payment transaction. At 632, the user 202-2 interacts with the wallet/payment app 512 to select the payment card account to fund the payment transaction. (According to an assumption noted above, the wallet/payment app in the mobile device 202-2 comes from a different source—i.e., a different WSP/FI—than the wallet/payment app in the mobile device 202-1.)

At 634, the respective wallet/payment app 512 controls the mobile device 204-2 to send a message to the application server 206-2 to request a payment account system transaction to transfer the requested monetary amount from the payment card account of the user 202-2 to the payment card account of the user 202-1. The message to the application server 206-2 may include: the transaction amount; the transaction type (transfer from the payment card account of user 202-2 to payment card account of user 202-1); the cryptogram included in the RCS message; the payment token representing the payment card account of the user 202-1 and a payment token that represents the payment card account of the user 202-2. It may be assumed that the application server 206-2 receives the message from the mobile device 204-2.

At 636, the application server 206-2 generates and sends a transaction request message to the payment network 108-*a*. This transaction request message may include the same data items referred to above in connection with block 634. It may be assumed that the payment network 108-*a* receives the transaction request message sent by the application server 206-2 at 636.

Referring now to FIG. 6B, at block 638 the payment network 108-*a* verifies the cryptogram and the transaction context. At 640 in FIG. 6B, the payment network 108-*a* translates the tokens for the payment card accounts into the corresponding PANs. (This assumes that the payment network 108-*a* itself serves as the token service provider; alternatively, the payment network 108-*a* obtains detokenization from a separate entity or server that acts as token service provider.)

At 642, the payment network 108-*a* interacts with account issuers 110-2 and 110-1 to implement the requested payment account system transaction. At 644, a notification that the transaction has occurred is provided to the user 202-1 via the account issuer 110-1, the application server 206-1 and the mobile device 204-1.

Figure 7:
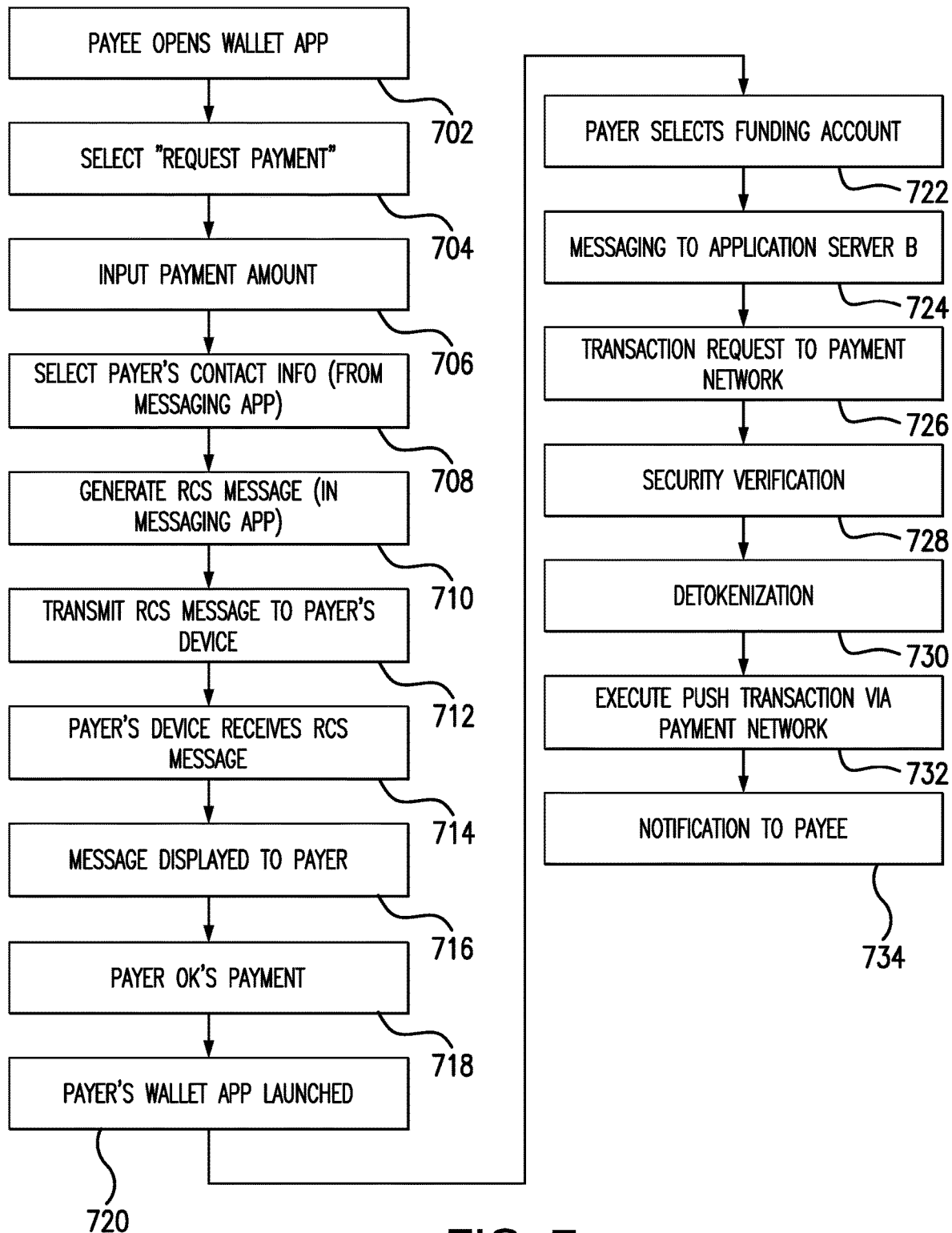

FIG. 7 is a flow chart that illustrates another process that may be performed in the payment transaction system 200 according to aspects of this disclosure. The process of FIG. 7 results in a payment network transaction like that referred to in connection with FIGS. 6A/6B, but without any involvement of the messaging gateway 208. A difference between the two processes is that in the process of FIG. 7, the user 202-1 selects the proposed payer (user 202-2) from a contacts list in the messaging app of the mobile device 204-1, rather than in the wallet/payment app of the mobile device 204-1.

Blocks 702, 704 and 706 of FIG. 7 may resemble or be essentially the same as blocks 602, 604 and 606 of FIG. 6A, and accordingly will not be described again. At block 708 in FIG. 7, the user 202-1 may select the proposed payer (assumed to be user 202-2) from a contacts list maintained in the messaging app 514 in the mobile device 202-1. In effect, this may result in the selection of the mobile telephone number assigned to the mobile device 204-2 operated by the user 202-2, with that mobile telephone number to be used as addressing information for subsequent messaging that is described below. (In an alternative scenario, and assuming the proposed payer is not on the messaging app contacts list, the user 202-1 may be allowed to enter the payer's mobile telephone number manually into the messaging app 512 for use in the transaction that is currently being requested.) The user's access to the messaging app at 708 may be invoked by the user actuating a "select payer" button presented by the wallet/payment app after block 706.

At block 710, the messaging app 514 in the mobile device 204-1 may generate an RCS message. This RCS message may be essentially the same as the RCS message that was described above in connection with block 620 of FIG. 6A. The RCS message therefore will not be described again. In generating the RCS message, the messaging app 514 (in mobile device 204-1) may obtain necessary information—including token, cryptogram, transaction amount and transaction type—from the wallet/payment app 512 (in the mobile device 204-1).

At block 712, the messaging app 514 controls the mobile device 204-1 to transmit to the mobile device 204-2 the RCS message generated at 710.

Blocks 714, 716, 718, 720, 722, 724, 726, 728, 730, 732 and 734 of FIG. 7 may correspond, respectively, to blocks 624, 626, 628, 630, 632, 634, 636, 638, 640, 642 and 644 of FIGS. 6A/6B. Accordingly, since the description of the latter group of process blocks applies to the former group of process blocks, that description will not be repeated at this point.

Among other possibilities, in the scenarios of FIGS. 6A/6B or FIG. 7, the user 202-1 may be a merchant who is requesting payment from a customer (user 202-2). Thus the payee may be a merchant, and these two scenarios may represent so-called P2M payment transactions.

Although, as described above, the scenario of FIGS. 6A/6B appears more complicated than the scenario of FIG. 7, nevertheless, from the point of view of the user experience for user 202-1, the scenario of FIGS. 6A/6B may be preferred, in that in the scenario of FIGS. 6A/6B the user 202-1 can accomplish the transaction request entirely within the wallet/payment app, and so need not "bounce" from the wallet/payment app to the messaging app in the mobile device 204-1.

Figure 8A:
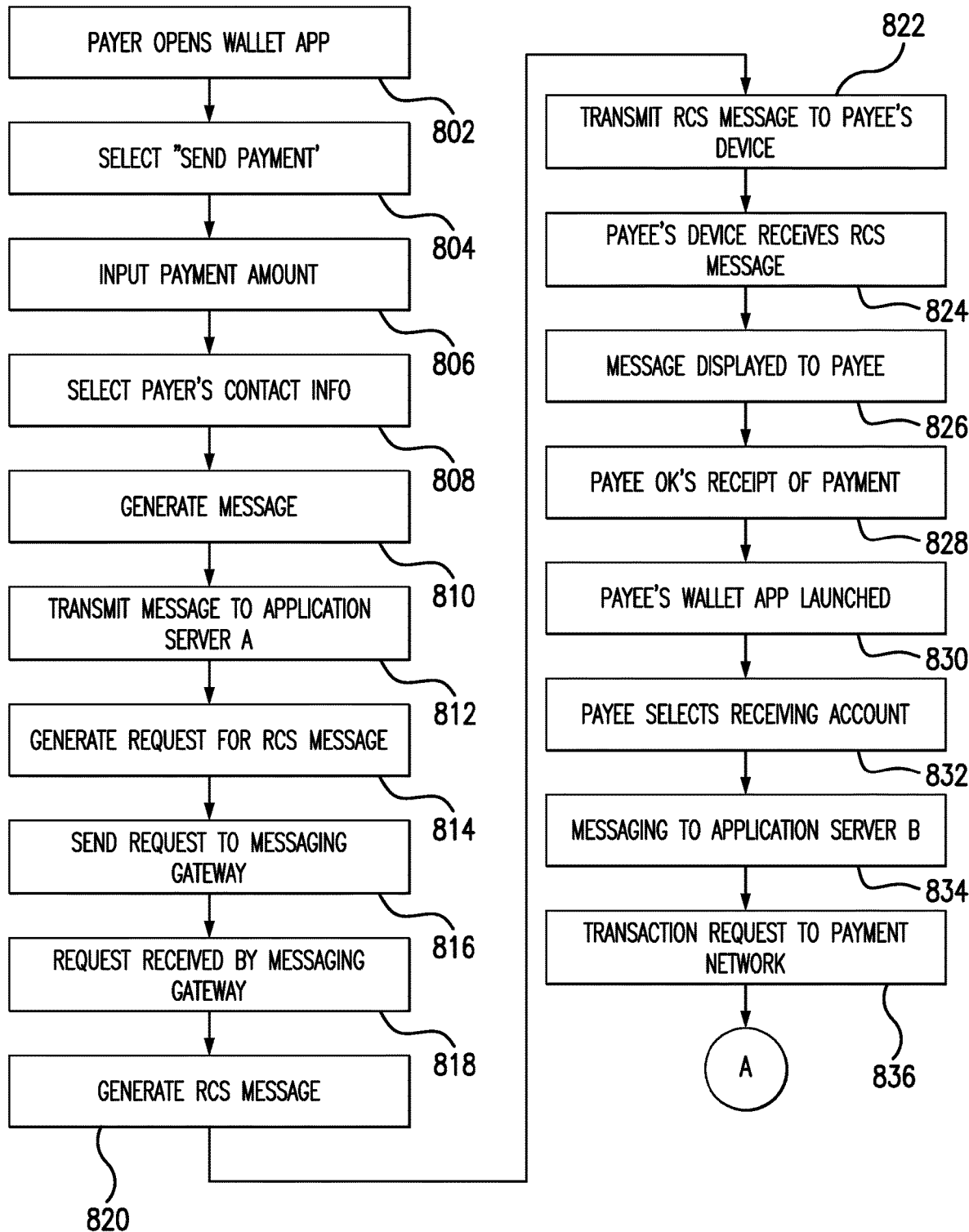
Figure 8B:
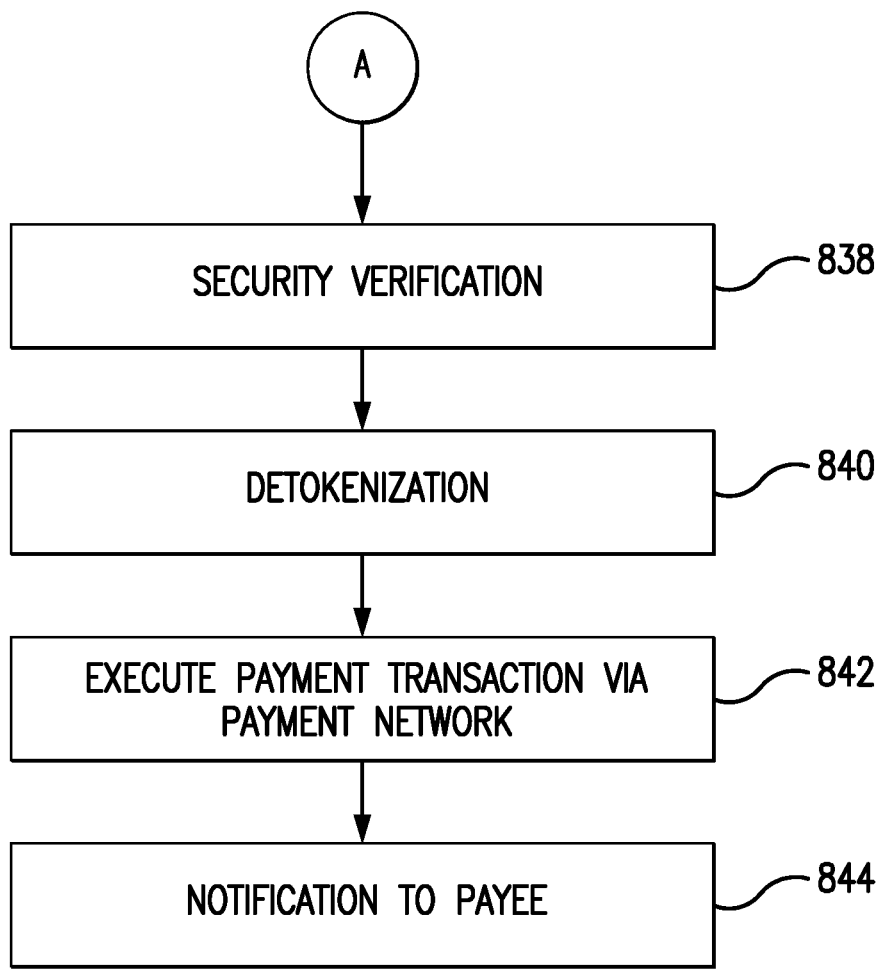

FIGS. 8A and 8B together form a flow chart that illustrates a process that may be performed in the payment transaction system 200 according to aspects of the present disclosure. The scenario represented in FIGS. 8A/8B differs from the scenario represented in FIGS. 6A/6B in that, in the scenario of FIGS. 8A/8B the user 202-1 is sending a payment to the user 202-2 rather than requesting a payment from the user 202-2. Accordingly, in FIGS. 8A/8B, user 202-1 is indicated as the "payer" and user 202-2 is indicated as the "payee".

At 802 in FIG. 8A, the user 202-1 opens the wallet (or payment) app 512 on his/her mobile device 204-1. At 804, the user 202-1 selects a "send payment" option that is presented by the wallet/payment app 512 on the user interface 504 of the mobile device 204-1. At 806, the user 202-1 is prompted to, and does, enter the monetary amount of the payment that the user 202-1 wishes to send.

At 808, the user 202-1 may select the proposed payee (assumed to be user 202-2) from a contacts list maintained in the wallet/payment app 512. In effect, this may result in the selection of the mobile telephone number assigned to the mobile device 204-2 operated by the user 202-2, with that mobile telephone number to be used as addressing information for subsequent messaging that is described below. (In an alternative scenario, and assuming the proposed payee is not on the wallet app contacts list, the user 202-1 may be allowed to enter the payee's mobile telephone number manually into the wallet app 512 for use in the transaction that is currently being requested.)

At 810, the wallet/payment app 512 generates a message to be sent to the application server 206-1. The message may contain data elements such as: a payment token that represents the payment card account which the user 202-1 wishes to use to fund the payment; the amount of the payment; the mobile telephone number assigned to the mobile device 204-2 operated by the user 202-2; a transaction type (in this case, send-payment); and a cryptogram The cryptogram may be generated by the wallet/payment app 512 based on inputs that include the monetary amount of the requested transaction and the transaction type. In some alternative embodiments, the cryptogram may be generated by the application server 206-1. In some embodiments, the cryptogram may be generated so as to only be valid for a limited period of time, which may be of a very short duration such as 20 or 60 seconds. In some embodiments, the cryptogram may be generated in accordance with some or all of the principles applied in generating an application cryptogram in connection with an EMV point-of-sale transaction.

At 812, under the control of the wallet/payment app 512, the mobile device 204-1 sends to the application server 206-1 the message generated at 810. Block 812 may also be considered to represent the application server 206-1 receiving the message.

At 814, the application server 206-1 generates a request for an RCS message. The request may include all the data elements referred to above in connection with block 810. The request may also include the name of the user 202-1, which the application server may have looked up based on, e.g., the mobile phone number of the mobile device 204-1, other device identifying information associated with the mobile device 204-1, or the payment token. At 816, the application server 206-1 sends the request to the messaging gateway 208. At 818, the messaging gateway 208 receives the request sent at 816.

At 820, the messaging gateway 208 generates an RCS message (which may be thought of as a "rich" message) based on the request received at 818. The RCS message may be addressed to the mobile telephone number assigned to the mobile device 204-2 and may contain: branding (e.g., logo or the like) for the payment network that will be used for the transaction; the name of the user 202-1, the payment token representing the payment account of the user 202-1, the cryptogram, the transaction amount, and a message indicating that the user 202-1 wishes to make a payment to the user 202-2.

At 822, the messaging gateway 208 may transmit to the mobile device 204-2 the RCS message generated at 820. At 824, the RCS message is received by the mobile device 204-2. At 826, the messaging app 514 of the mobile device 204-2 causes the RCS message to be displayed to the user 202-2 via the user interface 504 of the mobile device 204-2. Part of the displayed message may include an "Accept" button (virtual button on touchscreen). It is assumed that the user 202-2 actuates this button to accept the transaction (i.e., to receive the payment from the user 202-1). This accepting of the transaction is indicated at block 828 in FIG. 8A, and causes the wallet/payment app 512 in the mobile device 204-2 to be launched, as indicated at block 830, so that the user 202-2 can select—from his/her digital wallet—the payment card account that the user 202-2 wishes to use to receive the payment. At 832, the user 202-2 interacts with the wallet/payment app 512 to select the payment card account to receive the payment. (According to an assumption noted above, the wallet/payment app in the mobile device 202-2 comes from a different source—i.e., a different WSP/FI—than the wallet/payment app in the mobile device 202-1.)

At 834, the respective wallet app 512 controls the mobile device 204-2 to send a message to the application server 206-2 to request a payment account system transaction to transfer the requested monetary amount from the payment card account of the user 202-1 to the payment card account of the user 202-2. The message to the application server 206-2 may include: the transaction amount; the transaction type (transfer from the payment card account of user 202-1 to payment card account of user 202-2); the cryptogram included in the RCS message; the payment token representing the payment card account of the user 202-1 and a payment token that represents the payment card account of the user 202-2. It may be assumed that the application server 206-2 receives the message from the mobile device 204-2.

At 836, the application server 206-2 generates and sends a transaction request message to the payment network 108-*a*. This transaction request message may include the same data items referred to above in connection with block 834. It may be assumed that the payment network 108-*a* receives the transaction request message sent by the application server 206-2 at 836.

Referring now to FIG. 8B, at block 838 the payment network 108-*a* verifies the cryptogram and the transaction context. At 840 in FIG. 8A, the payment network 108-*a* translates the tokens for the payment card accounts into the corresponding PANs. (This assumes that the payment network 108-*a* itself serves as the token service provider; alternatively, the payment network 108-*a* obtains detokenization from a separate entity or server that acts as token service provider.)

At 842, the payment network 108-*a* interacts with account issuers 110-2 and 110-1 to implement the requested payment account system transaction. At 844, a notification may be sent to the user 202-2 to confirm that the payment has been received in his/her account. (A notification concerning successful completion of the transaction may also be sent to the user 202-1.)

Figure 9:
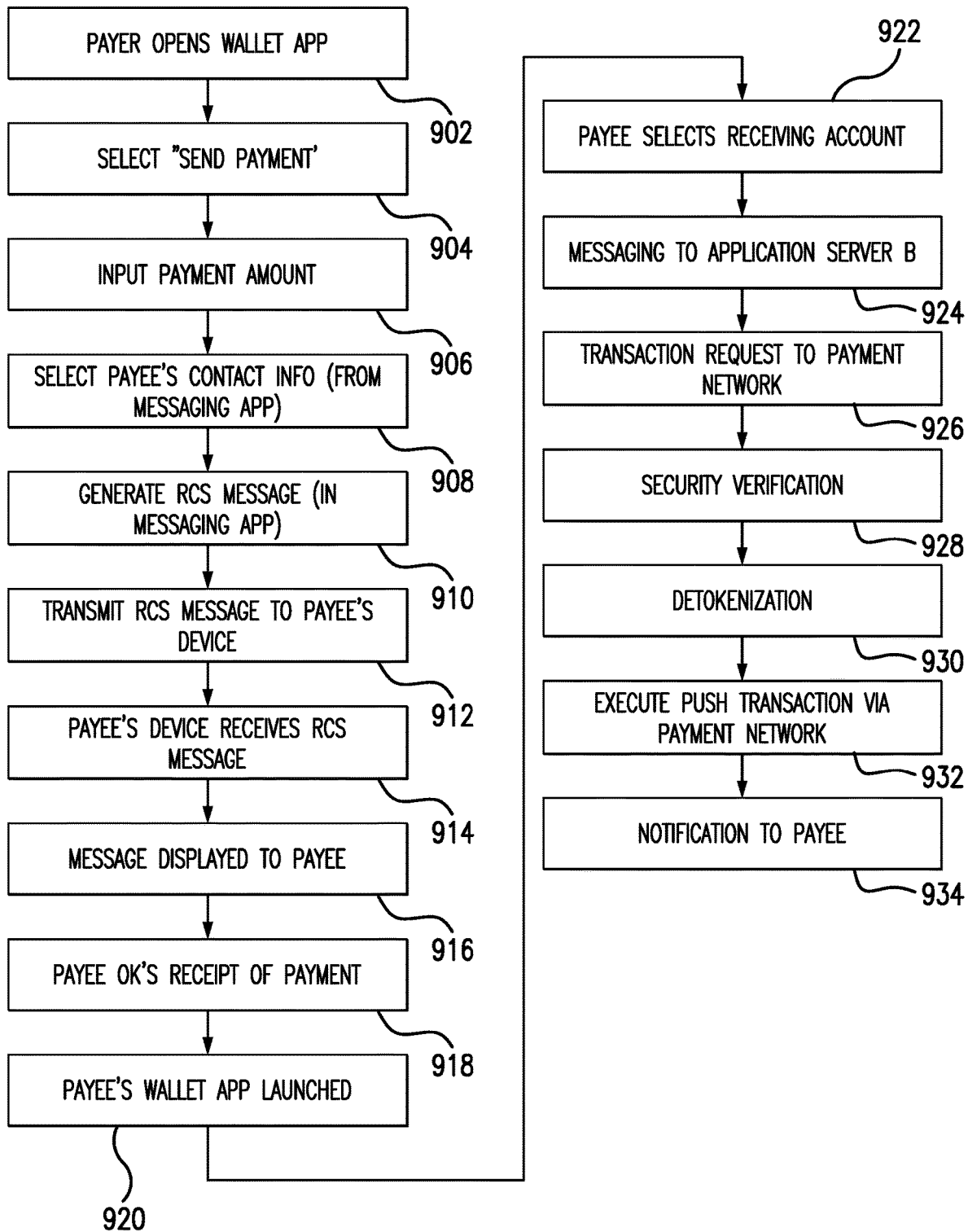

FIG. 9 is a flow chart that illustrates another process that may be performed in the payment transaction system 200 according to aspects of this disclosure. The process of FIG. 9 results in a payment network transaction like that referred to in connection with FIGS. 8A/8B, but without any involvement of the messaging gateway 208. A difference between the two processes is that in the process of FIG. 9, the user 202-1 selects the proposed payee (user 202-2) from a contacts list in the messaging app of the mobile device 204-1, rather than in the wallet/payment app of the mobile device 204-1.

Blocks 902, 904 and 906 of FIG. 7 may resemble or be essentially the same as blocks 802, 804 and 806 of FIG. 8A, and accordingly will not be described again. At block 908 in FIG. 9, the user 202-1 may select the proposed payee (assumed to be user 202-2) from a contacts list maintained in the messaging app 514 in the mobile device 202-1. In effect, this may result in the selection of the mobile telephone number assigned to the mobile device 204-2 operated by the user 202-2, with that mobile telephone number to be used as addressing information for subsequent messaging that is described below. (In an alternative scenario, and assuming the proposed payee is not on the messaging app contacts list, the user 202-1 may be allowed to enter the payee's mobile telephone number manually into the messaging app 512 for use in the transaction that is currently being requested.) The user's access to the messaging app at 908 may be invoked by the user actuating a "select payee" button presented by the wallet/payment app after block 906.

At block 910, the messaging app 514 in the mobile device 204-1 may generate an RCS message. This RCS message may be essentially the same as the RCS message that was described above in connection with block 820 of FIG. 8A. The RCS message therefore will not be described again. In generating the RCS message, the messaging app 514 (in mobile device 204-1) may obtain necessary information— including token, cryptogram, transaction amount and transaction type—from the wallet/payment app 512 (in the mobile device 204-1).

At block 912, the messaging app 514 controls the mobile device 204-1 to transmit to the mobile device 204-2 the RCS message generated at 910.

Blocks 914, 916, 918, 920, 922, 924, 926, 928, 930, 932 and 934 of FIG. 9 may correspond, respectively, to blocks 824, 826, 828, 830, 832, 834, 836, 838, 840, 842 and 844 of FIGS. 8A/8B. Accordingly, since the description of the latter group of process blocks applies to the former group of process blocks, that description will not be repeated at this point.

Although, as described above, the scenario of FIGS. 8A/8B appears more complicated than the scenario of FIG. 9, nevertheless, from the point of view of the user experience for user 202-1, the scenario of FIGS. 8A/8B may be preferred, in that in the scenario of FIGS. 8A/8B the user 202-1 can accomplish the transaction request entirely within the wallet/payment app, and so need not "bounce" from the wallet/payment app to the messaging app in the mobile device 204-1.

With P2P or P2M processes as described herein, the payer and the payee need not both be users of the same proprietary messaging system and need not rely on the payment security practices of the operator of a proprietary messaging system. In other words, in the system 200, a user may, if he/she chooses, rely entirely on financial institutions for payment transactions, and need not place trust in nonfinancial companies such as social media platform operators or equipment manufacturers. At the same time, the system 200 is "open-loop" such that any two individuals who have payment accounts issued under the same payment network can engage in payment transactions with each other, even though they use different wallet and/or payment applications in their mobile devices and even though their payment accounts are issued by different account issuers. Ease of use may be incorporated into the system 200 via "rich" messaging through RCS.

For the process flows of FIGS. 6-9, it has been assumed that the mobile device 204-2 of the user 202-2 ("user B") runs a suitable wallet or payment app to perform functions as described in connection with those process flows. A variation of such process flows may occur in cases where such a wallet or payment app is not present in the mobile device 204-2. According to the variation of the process in such cases, when the user 202-2 accepts the transaction, a website hosted by the payment network operator or by the WSP for user 202-1 (for example) may be accessed by the mobile browser running in mobile device 204-2. The user 202-2 can then enter card account information into the website and receive payment or send payment, as the case may be.

Figure 10:
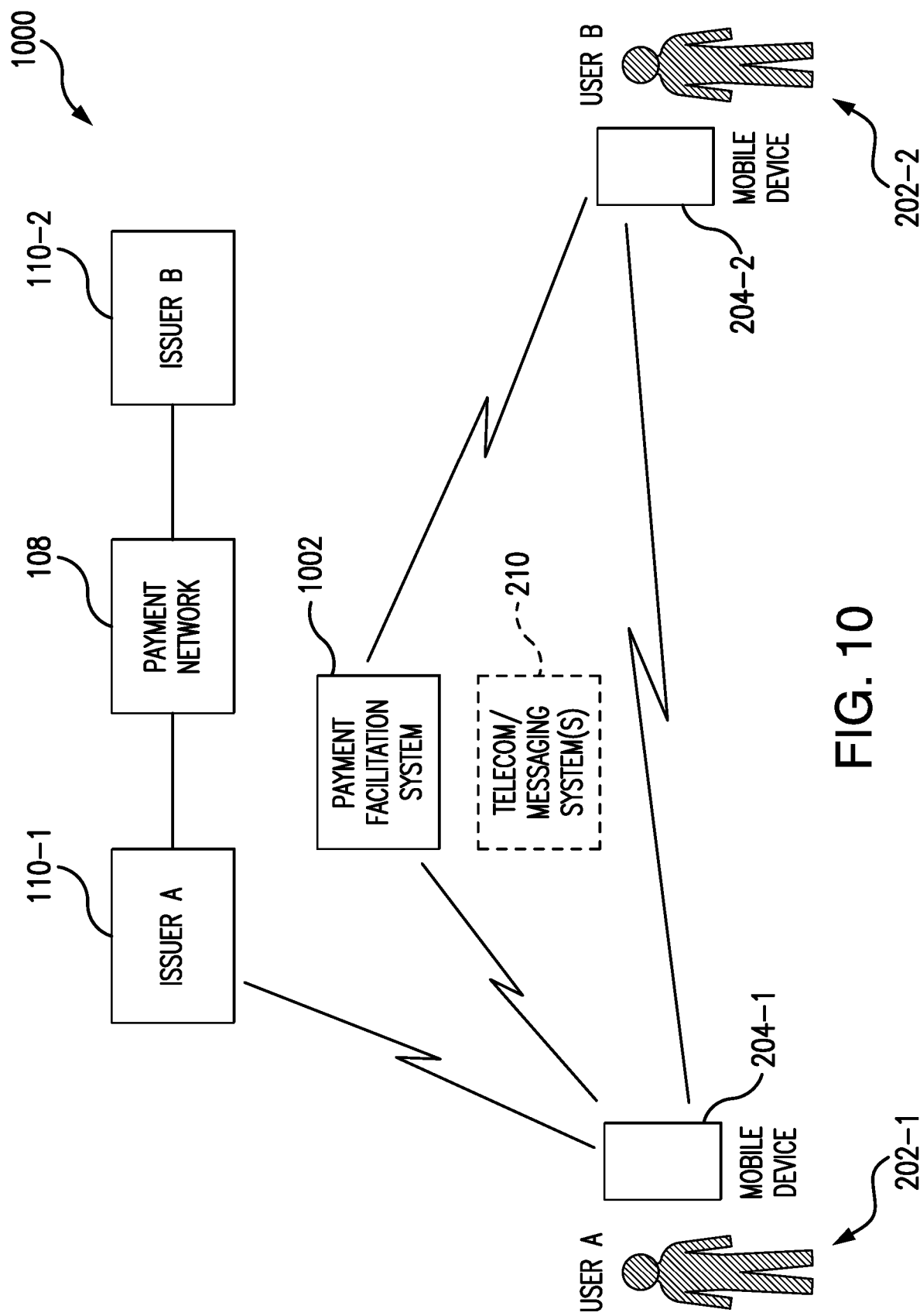
FIG. 10 is a block diagram of another embodiment of a payment transaction system provided in accordance with aspects of the present disclosure.

FIG. 10 is a block diagram of a payment transaction system 1000 provided in accordance with aspects of the present disclosure.

In FIG. 10, again users 202-1 and 202-2 are schematically shown, with their mobile devices (respectively) 204-1 and 204-2. For purposes of this embodiment, the user 202-1 is assumed to be a payment transaction sender (also referred to as the "remitter") and the user 202-2 is assumed to be the recipient for the payment transaction. As will be understood from subsequent discussion, the mobile devices 204-1, 204-2 may be programmed somewhat differently and/or may perform somewhat different functions as compared with scenarios described above in connection with the payment system 200 of FIG. 2. The description of a typical one of the mobile devices 204 provided above in connection with FIG. 5 is applicable to the mobile devices 204 shown in FIG. 10.

FIG. 10 schematically illustrates a typical payment transaction. In connection with the transaction, the mobile device 204-1 of the user 202-1 may generate and transmit a message to the mobile device 204-2 of the user 202-1. The message may, e.g., be an RCS message and may contain a URL (uniform resource locator). Via the URL, the mobile device 204-2 may come into communication with a payment facilitation system 1002. The payment facilitation system 1002 (which may also be considered a credential capture tool) may, for example, be based on the well-known SRC (Secure Remote Commerce) specification, or any future interoperable specification, whether defined by EMVCo or by another standards organization.

As will be seen the payment facilitation system 1002 may provide to the mobile device 204-1 a payment token that points to a payment account owned by the recipient/user 204-2.

The remitter's mobile device 204-1 may be in communication with the remitter's payment account issuer 110-1, to initiate a payment card account system "push" transaction to transfer funds to the recipient's payment account maintained at the recipient's payment account issuer 110-2. As in the case of the system 200 of FIG. 2, the issuers 110-1 and 110-2 may be of the type of entity referred to in connection with block 110 in FIG. 1.

Block 210, shown in phantom, represents one or more interconnected mobile telecommunications and/or messaging systems. The telecom/messaging infrastructure 210 enables RCS and/or other types of mobile telecommunications that take place between the mobile devices 204-1 and the mobile device 204-2; as well as other wireless remote messaging that occurs in the payment system 100.

FIG. 10 only shows system components used in one transaction. In a practical embodiment of the payment system 1000, there may be a very large number of users, and a correspondingly large number of mobile devices. There may be more than one payment facilitation system, more than one payment network, and a large number of account issuers.

Figure 11:
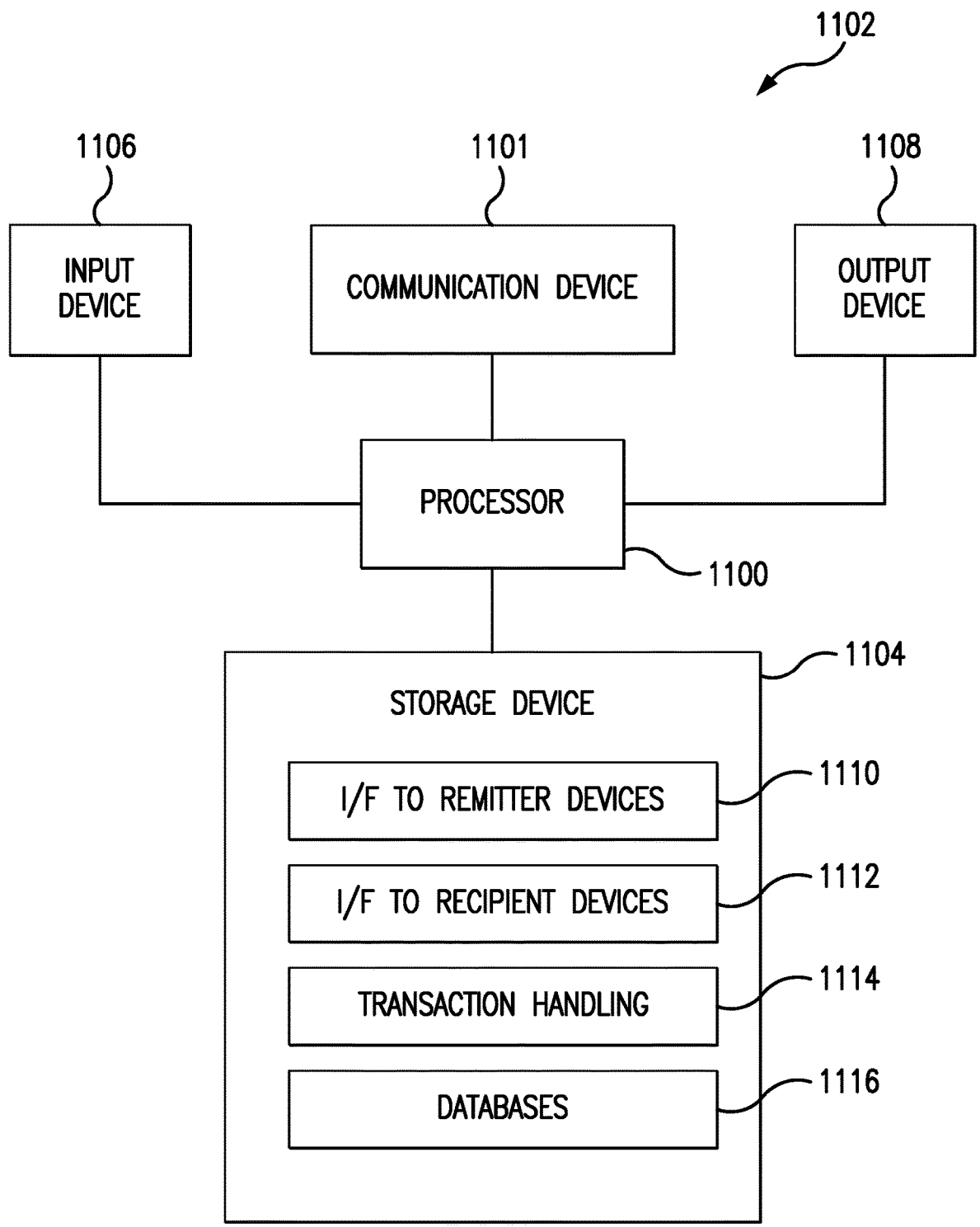
FIG. 11 is a block diagram of an example computer system that may perform functions in the system of FIG. 10.

FIG. 11 is a block diagram that illustrates an example of a computer system 1102 that implements at least some of the functionality of the payment facilitation system 1002. The computer system 1102 will accordingly be referred to as a "payment facilitation computer". The payment facilitation computer 1102 may have the same type of hardware architecture and the same types of hardware components as were described above in connection with FIG. 3. Accordingly, the payment facilitation computer 1102 may include a processor 1100 in communication with a communication device 1101, a storage device 1104, an input device 1106 and an output device 1108.

Storage device 1104 stores one or more programs for controlling processor 1100. The programs comprise program instructions (which may be referred to as computer readable program code means) that contain processor-executable process steps of the payment facilitation computer 1102, executed by the processor 1100 to cause the payment facilitation computer 1102 to function as described herein.

The programs may include one or more conventional operating systems (not shown) that control the processor 1100 so as to manage and coordinate activities and sharing of resources in the payment facilitation computer 1102, and to serve as a host for application programs (described below) that run on the payment facilitation computer 1102.

The storage device 1104 may also store a software interface 1110 that facilitates communication between the payment facilitation computer 1102 and remitters' mobile devices. In addition, the storage device 1104 may store a software interface 1112 that facilitates communication between the payment facilitation computer 1102 and recipients' mobile devices.

Moreover, the storage device 1104 may store a transaction handling application program 1114. The transaction handling application program 1114 may control the processor 1100 such that the payment facilitation computer 1102 facilitates payment transactions in ways that are described herein.

The storage device 1104 may also store, and the payment facilitation computer 1102 may also execute, other programs, which are not shown. For example, such programs may include communications software and a reporting application. The latter program may respond to requests from system administrators for reports on the activities performed by the payment facilitation computer 1102. The other programs may also include, e.g., device drivers, database management software, etc.

The storage device 1104 may also store one or more databases 1116 needed for operation of the payment facilitation computer 1102.

Figure 12:
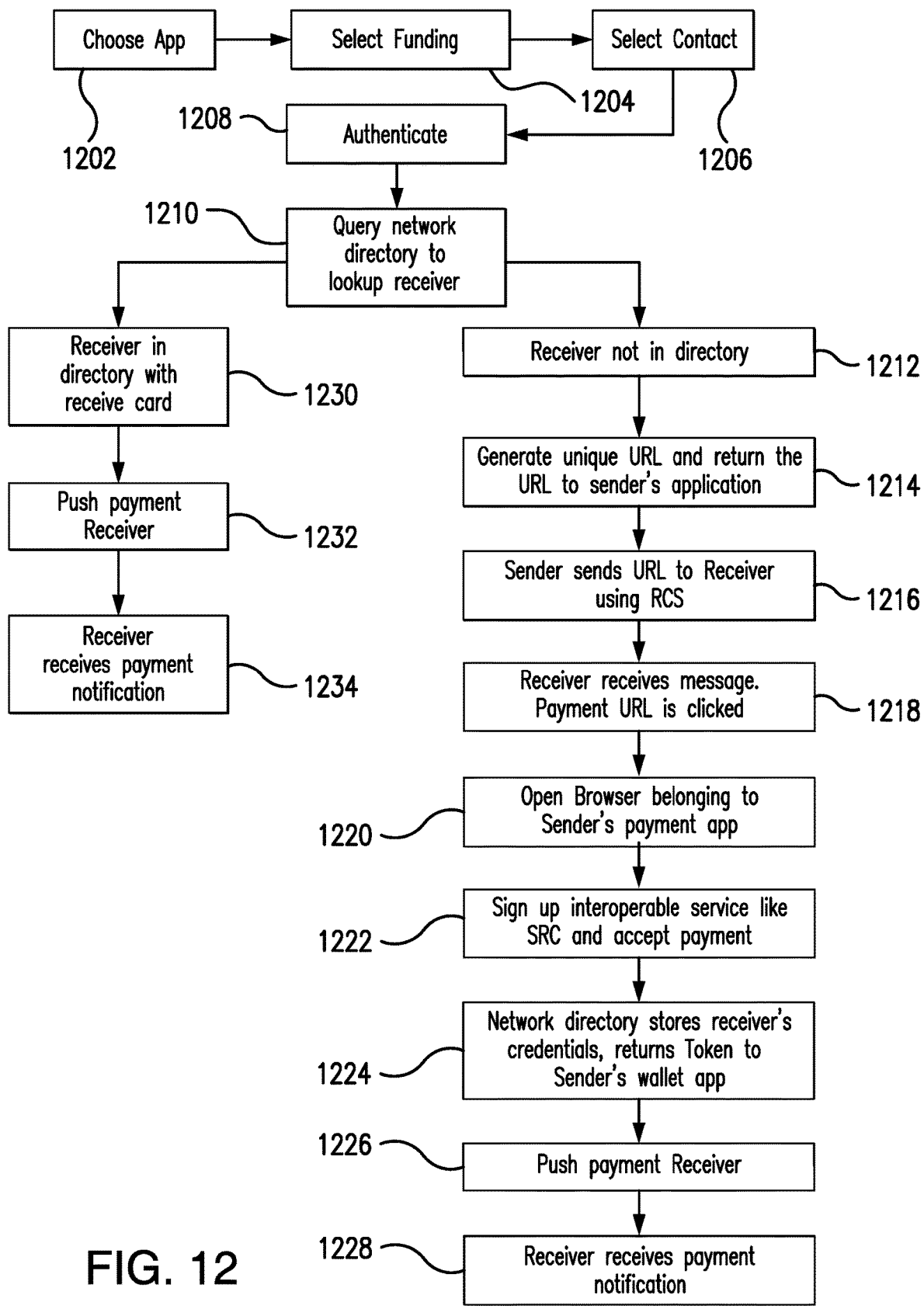
FIG. 12 is a flow chart that illustrates a process that may be performed in the system of FIG. 10 in accordance with aspects of the present disclosure.

FIG. 12 is a flow chart that illustrates a process that may be performed in the system 1000 of FIG. 10 in accordance with aspects of the present disclosure.

At 1202 in FIG. 2, a payment transaction remitter (user 202-1) may operate his/her mobile device 204-1 to select a suitable app for performing a remittance transaction (i.e., a transfer of funds to a recipient, also referred to as a "P2P payment"). At 1204, the remitter may operate the mobile device 204-1 to select a source of funding (i.e., one of the remitter's payment card system accounts) for the remittance transaction. The remitter may also operate the mobile device 204-1 to indicate the amount of the remittance (transaction amount).

At 1206, the remitter may operate the mobile device 204-1 to select contact information that corresponds to the recipient for the remittance transaction. At 1208, the remitter may perform a suitable procedure to authenticate himself/herself to the mobile device/app so that the transaction can go forward. For example, entry of a PIN or biometric authentication may be performed.

At 1210 a directory is queried to determine whether the recipient's account information is available. If not (block 1212), the process branches from 1210 to 1212 and 1214. At 1214, a transaction-specific URL is generated and is passed to the remittance app. In this context (and in the appended claims), "transaction-specific" means that the URL was generated specifically for the current remittance transaction and is usable only in connection with the current transaction. (In some embodiments, the URL is generated in the remitter's mobile device and points to a web location maintained by the payment facilitation system while identifying the desired remittance transaction.)

Block 1216 follows block 1214. At block 1216, the remitter's mobile device sends a message to the recipient's mobile device. The message may be an RCS message, and may contain the URL generated at 1214. At block 1218, the recipient's mobile device receives the message that was sent at 1216. The message may cause information to be displayed on the screen of the recipient's mobile device. The information may indicate to the recipient that the remitter wishes to make a remittance to the recipient (including the amount of the remittance). The information may also include the URL, with a prompt to the recipient to actuate the URL to receive the remittance. It may be assumed that the recipient actuates the URL (link) by touching or clicking on the URL.

At 1220, the actuation of the URL causes the browser to be launched in the recipient's mobile device, and further causes the recipient's mobile device to come into communication with the payment facilitation system 1002 (FIG. 10). Continuing to refer to FIG. 12, at 1222, the recipient interacts with his/her mobile device, and the mobile device interacts with the payment facilitation system 1002, such that the recipient is enrolled in a service such as SRC (Secure Remote Commerce), as referred to above. The recipient also accepts the remittance payment and enters information to indicate the recipient's payment card system account to which the remittance (transaction amount) is to be credited.

At 1224, the payment facilitation system 1002 (possibly in conjunction with the payment network 108 (FIG. 10)) may store the recipient's payment account credentials, and may return a token to the remitter's mobile device. The token points to the recipient's payment card system account, without disclosing the account number.

The remitter's mobile device, now having been provided with the token, has all information required to initiate a payment card system "push" transaction to transfer the transaction amount from the remitter's payment account to the recipient's payment account. The push transaction is indicated at 1226 in FIG. 12, and may involve interaction between the remitter's mobile device and the remitter's account issuer 110-1 (FIG. 10). Continuing to refer to FIG. 12, at block 1228, the recipient may be informed, via his/her mobile device, that the payment transaction has occurred. The remitter may be similarly informed.

Considering again block 1210, if the recipient's account credentials are in the directory, the process may branch to block 1230 from 1210. The remitter's mobile device is provided with a token or other suitable recipient account information, and is able to initiate a push payment transaction (block 1232) in the recipient's favor. At 1234, the recipient may be notified that the remittance transaction has occurred. The remitter may also be notified.

In some embodiments, a payment app running in the remitter's mobile device may perform steps 1202, 1204, 1206, 1208 and 1216; in some embodiments, a wallet app running in the remitter's mobile device may perform steps 1210, 1214 and 1226.

With the system and process as described above in connection with FIGS. 10 and 12, a true "open loop" payment system is achieved. The remitter is able to initiate a payment transaction to the recipient, without the two having accounts in a common money transfer scheme. All that is necessary is that both have payment card system accounts, which may have been issued by different financial institutions.

Figure 13:
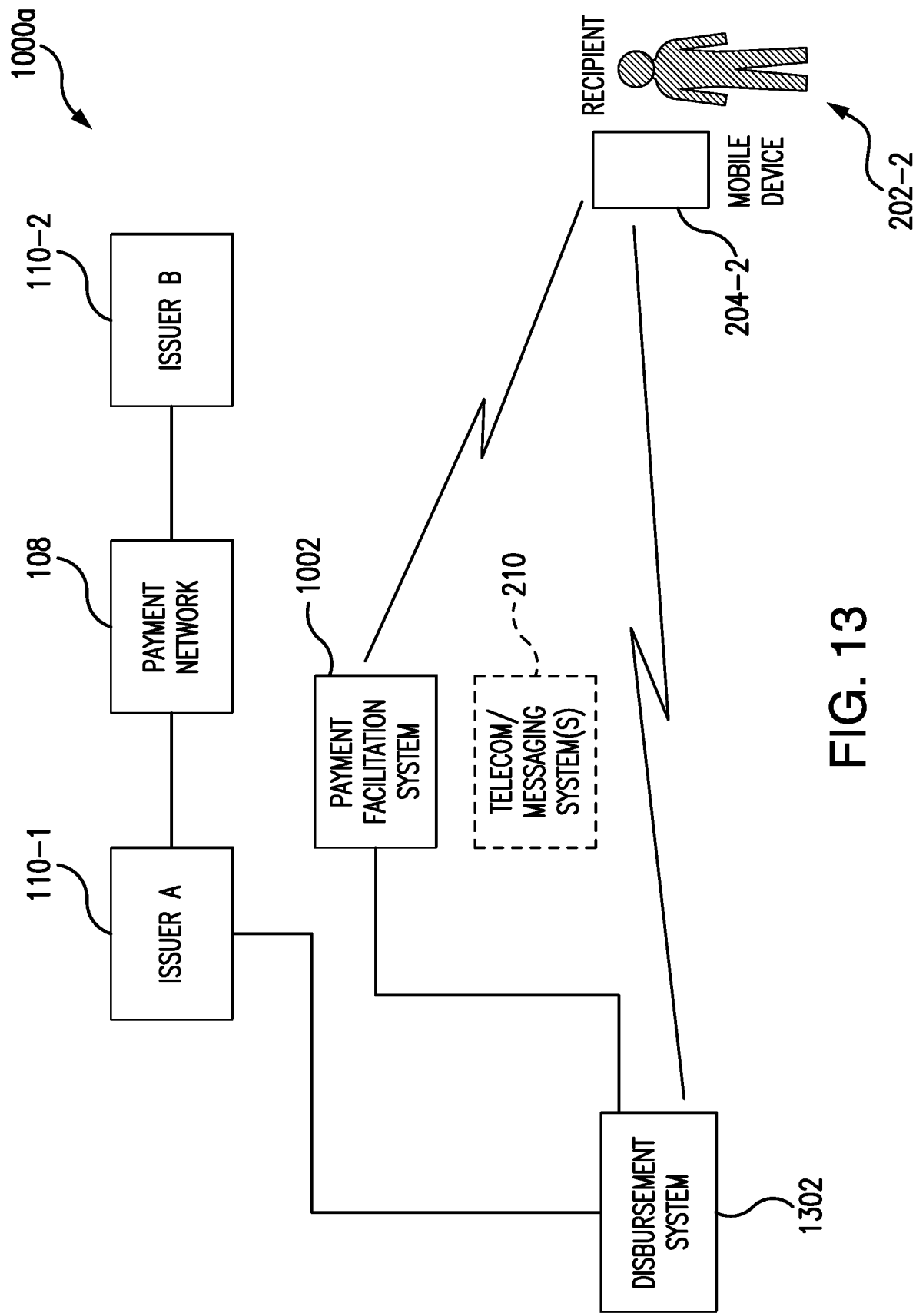
FIG. 13 is a block diagram of still another embodiment of a payment transaction system provided in accordance with aspects of the present disclosure.

FIG. 13 is a block diagram of still another embodiment of a payment transaction system (generally indicated by reference 1000a in the drawing) provided in accordance with aspects of the present disclosure. According to some embodiments, the system 1000a may be regarded as a particular use-case of the system 1000, and a single system may be provided that incorporates all of the components shown in FIGS. 10 and 13.

The system/use-case 1000a of FIG. 13 may include all of the following components/entities also shown in FIG. 10: mobile device 204-2, user/recipient 202-2, payment facilitation system 1002, the mobile telecom/messaging system(s) 210, the account issuers 110-1 and 110-2 and the payment network 108. In place of the remitter and his/her mobile device shown in FIG. 10, FIG. 13 shows a disbursement system 1302. The disbursement system 1302 may be an entity or organization that disburses benefit payments, reimbursements (e.g., insurance reimbursements) and/or other amounts owed or payable to recipients such as the recipient 202-2. Although only one reimbursement system 1302 is shown in the drawing, nevertheless it should be understood that in a practical embodiment of the system 1000a, there may be numerous disbursement systems.

Figure 14:
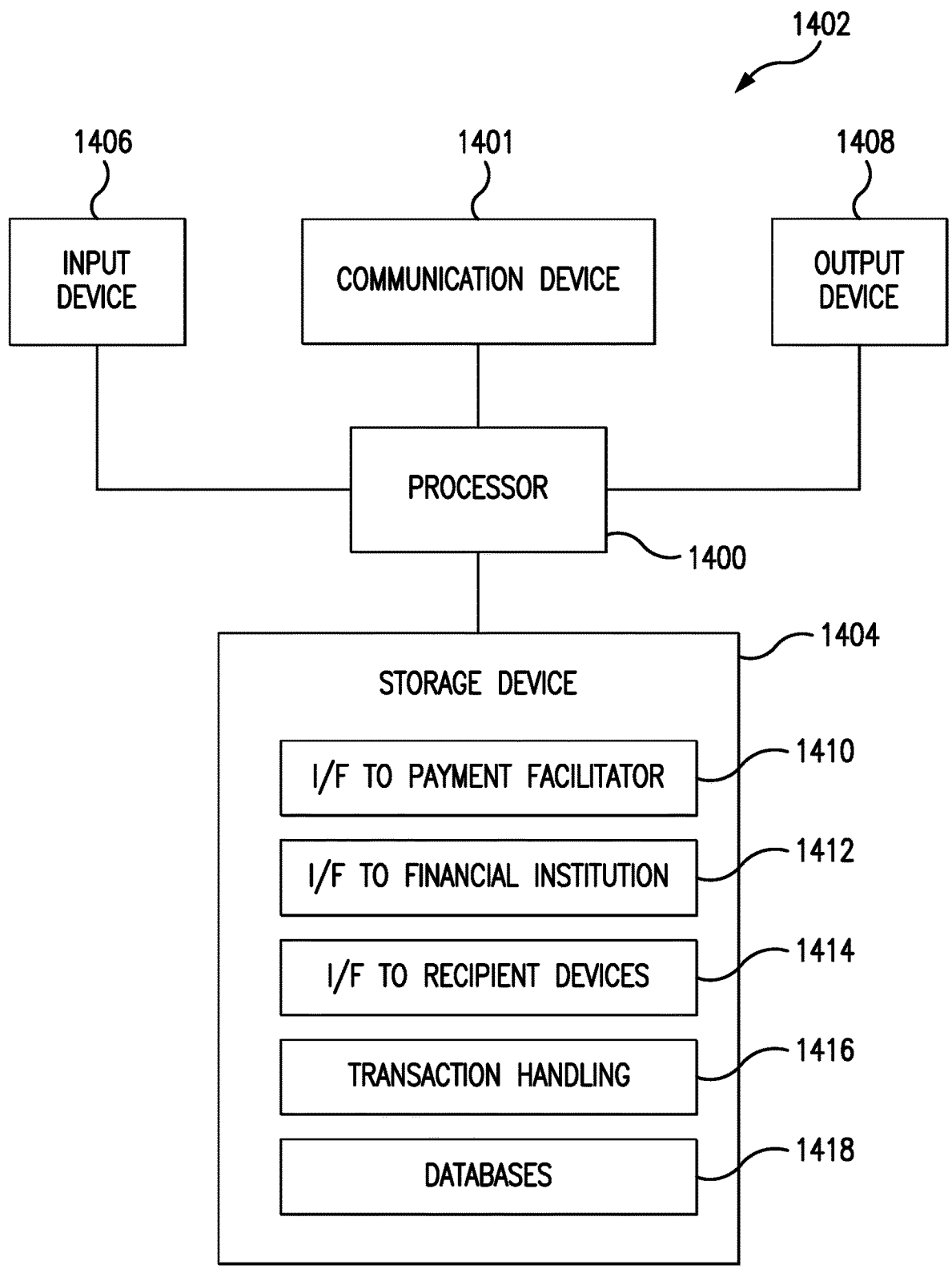
FIG. 14 is a block diagram of an example computer system that may perform functions in the system of FIG. 13.

FIG. 14 is a block diagram that illustrates an example of a computer system 1402 that implements at least some of the functionality of the disbursement system 1302. The computer system 1402 will accordingly be referred to as a "disbursement system computer". The disbursement system computer 1402 may have the same type of hardware architecture and the same types of hardware components as were described above in connection with FIG. 3. Accordingly, the disbursement system computer 1402 may include a processor 1400 in communication with a communication device 1401, a storage device 1404, an input device 1406 and an output device 1408.

Storage device 1404 stores one or more programs for controlling processor 1400. The programs comprise program instructions (which may be referred to as computer readable program code means) that contain processor-executable process steps of the disbursement system computer 1402, executed by the processor 1400 to cause the disbursement system computer 1402 to function as described herein.

The programs may include one or more conventional operating systems (not shown) that control the processor 1400 so as to manage and coordinate activities and sharing of resources in the disbursement system computer 1402, and to serve as a host for application programs (described below) that run on the disbursement system computer 1402.

The storage device 1404 may also store a software interface 1410 that facilitates communication between the disbursement system computer 1402 and the payment facilitation system 1002. Also the storage device 1404 may store a software interface 1412 that facilitates communication between the disbursement system computer 1402 and the disbursement system's FI (payment account issuer). In addition, the storage device 1404 may store a software interface 1414 that facilitates communication between the disbursement system computer 1402 and recipients' mobile devices.

Moreover, the storage device 1404 may store a transaction handling application program 1416. The transaction handling application program 1416 may control the processor 1400 such that the disbursement system computer 1402 engages in disbursement transactions as described herein.

The storage device 1404 may also store, and the disbursement system computer 1402 may also execute, other programs, which are not shown. For example, such programs may include communications software and a reporting application. The latter program may respond to requests from system administrators for reports on the activities performed by the disbursement system computer 1402. The other programs may also include, e.g., device drivers, database management software, etc.

The storage device 1404 may also store one or more databases 1418 needed for operation of the disbursement system computer 1402.

Figure 15:
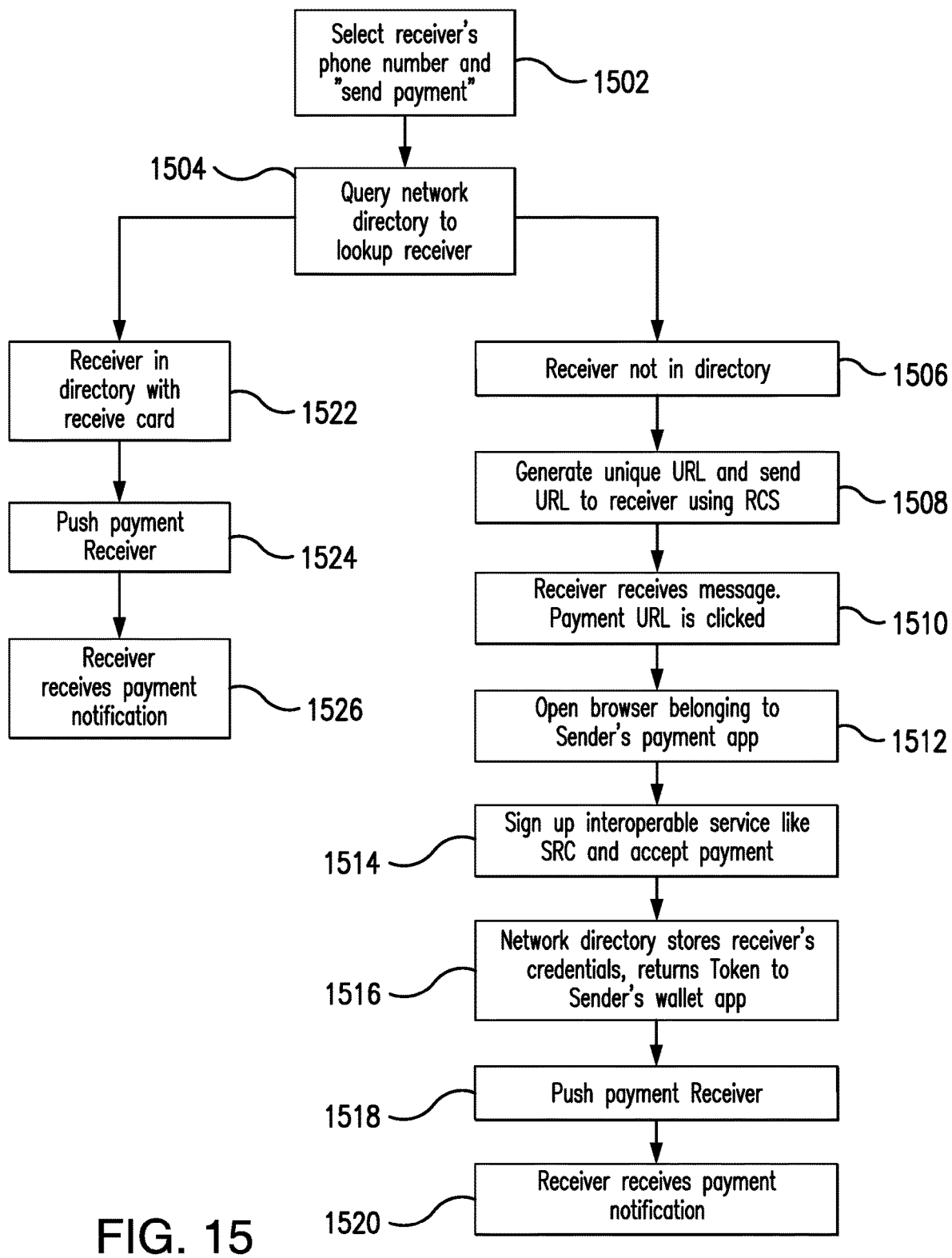
FIG. 15 is a flow chart that illustrates a process that may be performed in the system of FIG. 13 in accordance with aspects of the present disclosure.

FIG. 15 is a flow chart that illustrates a process that may be performed in the system 1000a of FIG. 13 in accordance with aspects of the present disclosure.

At 1502 in FIG. 15, the disbursement system 1302 selects the mobile phone number for the recipient for a disbursement transaction, and initiates processing of the transaction, including specification of the amount to be disbursed (transaction amount).

At 1504, a directory is queried to determine whether the recipient's account information is available. If not (block 1506), the process branches from 1504 to 1506 and 1508. At 1508, a transaction-specific URL (as defined above) is generated and a message is sent by the disbursement system 1302 to the recipient's mobile device. The message may be an RCS message, and may contain the URL. At block 1510, the recipient's mobile device receives the message that was sent at 1508. The message may cause information to be displayed on the screen of the recipient's mobile device. The information may indicate to the recipient that the disbursement system wishes to make a disbursement to the recipient (including the amount of the disbursement, in some cases). The information may also include the URL, with a prompt to the recipient to actuate the URL to receive the disbursement. It may be assumed that the recipient actuates the URL (link) by touching or clicking on the URL.

At 1512, the actuation of the URL causes the browser to be launched in the recipient's mobile device, and further causes the recipient's mobile device to come into communication with the payment facilitation service 1002 (FIG. 13). Continuing to refer to FIG. 15, at 1514, the recipient interacts with his/her mobile device, and the mobile device interacts with the payment facilitation service 1002, such that the recipient is enrolled in a service such as SRC, as referred to above. The recipient also accepts the disbursement and enters information to indicate the recipient's payment card system account to which the disbursement is to be credited.

At 1516, the payment facilitation service 1002 (possibly in conjunction with the payment network 108 (FIG. 13)) may store the recipient's payment account credentials, and may return a token to the disbursement system 1302. The token points to the recipient's payment card system account, without disclosing the account number.

The disbursement system 1302 now has all information required to initiate a payment card system "push" transaction to transfer the transaction amount (disbursement amount) from the disbursement system's payment account to the recipient's payment account. The push transaction is indicated at 1518 in FIG. 15, and may involve interaction between the disbursement system 1302 and the disbursement system's account issuer 110-1 (FIG. 13). Continuing to refer to FIG. 15, at block 1520, the recipient may be informed, via his/her mobile device, that the payment transaction has occurred. The disbursement system may also be informed.

Considering again block 1504, if the recipient's account credentials are in the directory, the process may branch from block 1504 to block 1522. The disbursement system has or is provided with a token or other suitable recipient account information, and is able to initiate a push payment transaction (block 1524) in the recipient's favor. At 1526, the recipient may be notified that the disbursement transaction has occurred. The disbursement system may also be notified.

In some embodiments, the disbursement system computer 1402 may be a server computer and may perform steps 1504, 1508 and 1518.

The system and process as described above in connection with FIGS. 13 and 15 may be a more cost-effective and efficient manner of performing disbursement as compared to disbursement by check. (Disbursement by check often occurs under current practices because of the difficulties that may be encountered if disbursing entities were to attempt to obtain recipients' account information.) The payment system of FIG. 15 effectively overcomes the roadblocks of existing systems, and facilitates electronic disbursement, without either disclosing sensitive recipient account information or burdening disbursing entities with the inconvenience of obtaining, storing, etc. of recipients' account information.

RCS has been mentioned above as an example of a messaging service that may be used to facilitate the open-loop payment systems described herein. However, other types of messaging services may be used instead of RCS.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

As used herein and in the appended claims, a "server" includes a computer device or system that responds to numerous requests for service from other devices.

The above descriptions and illustrations of processes herein should not be considered to imply a fixed order for performing the process steps. Rather, the process steps may be performed in any order that is practicable, including simultaneous performance of at least some steps and/or omission of steps.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" and "payment account" are used interchangeably herein. The term "payment card account number" includes a number that identifies a payment card system account or a number carried by a payment card, or a number that is used to route a transaction in a payment system that handles payment card transactions. The term "payment card" includes a credit card, debit card, prepaid card, or other type of payment instrument, whether an actual physical card, electronic, or virtual.

As used herein and in the appended claims, the term "payment card system" or "payment account system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present disclosure has been described in connection with specific example embodiments, it should be understood that various changes, substitutions, and alterations apparent to those skilled in the art can be made to the disclosed embodiments without departing from the spirit and scope of the disclosure.

What is claimed is:

1. A method of operating a mobile device to transmit a payment to a recipient, the mobile device operated by a sender of the payment, the method comprising:

selecting, by a sender using a sender mobile device, a payment application for operation on the mobile device;

selecting, by the sender using the sender mobile device running the payment application, a payment card account to fund a payment to a recipient;

selecting, by the sender using the sender mobile device running the payment application, the recipient;

authenticating, by the sender mobile device running the payment application, the sender to the payment application;

querying, by the sender mobile device, a network directory by running a wallet application to look for the recipient's account information;

receiving, by the sender mobile device, an indication that the recipient's account information is not in the network directory;

generating, by the sender mobile device, a transaction specific URL (uniform resource locator), by running the wallet application, the transaction specific URL pointing to a web location maintained by a payment facilitation system;

generating, by the sender mobile device running the payment application, a message to the recipient, the message including the transaction specific URL;

transmitting, by the sender mobile device, the message to a mobile device of the recipient;

receiving, by the sender mobile device running the wallet application from the payment facilitation system, a token representing a payment card account of the recipient, said token generated by the payment facilitation system in response to access to the web location by a mobile device of the recipient; and transmitting, by the sender mobile device running the wallet application to an issuer of the payment card account of the sender, a push payment transaction request including the token, the push payment transaction request for benefit of the recipient.

2. The method of claim 1, wherein the message to the recipient is in an RCS (rich communication service) format.

3. The method of claim 1, wherein the mobile device stores a mobile phone number that corresponds to the recipient.

4. The method of claim 3, wherein the message to the recipient is addressed to said mobile phone number.

5. The method of claim 1, wherein the mobile device is the sender's mobile phone.

6. The method of claim 1, wherein the network directory is associated with the payment network.

7. The method of claim 6, wherein the message to the recipient is an SMS (short messaging service) message.

8. A method of operating a server computer to transmit a disbursement payment to a recipient, the server computer operated by a sender of the disbursement payment, the method comprising:

selecting, by a server computer, a recipient;

querying, by the server computer, a network directory to look for the recipient's account information;

receiving, by the server computer, an indication that the recipient's account information is not in the network directory;

generating, by the server computer, a transaction specific URL (uniform resource locator), the transaction specific URL pointing to a web location maintained by a payment facilitation system;

generating, by the server computer, a message, the message including the transaction specific URL;

transmitting, by the server computer, the message to a mobile device of the recipient, the message addressed to the recipient's mobile phone number;

receiving, by the server computer from the payment facilitation system, a token representing a payment card account of the recipient, said token generated by the payment facilitation system in response to access to the web location by the recipient; and transmitting, by the server computer to an issuer of a payment card account of the sender, a push payment transaction request including the token, the push payment transaction request for benefit of the recipient.

9. The method of claim 8, wherein the message is in an RCS (rich communication service) format.

10. The method of claim 8, wherein the message is an SMS (short messaging service) message.

11. The method of claim 8, wherein the network directory is associated with the payment network.

12. The method of claim 8, wherein the server computer stores the recipient's mobile phone number.

* * * * *